(12) United States Patent
Sakai

(10) Patent No.: US 7,292,919 B2
(45) Date of Patent: Nov. 6, 2007

(54) STEERING CONTROL DEVICE

(75) Inventor: Atsuo Sakai, Okazaki (JP)

(73) Assignee: JTEKT Corporation, Osaka (JP)

( * ) Notice: Subject to any disclaimer, the term of this patent is extended or adjusted under 35 U.S.C. 154(b) by 410 days.

(21) Appl. No.: 10/728,367

(22) Filed: Dec. 3, 2003

(65) Prior Publication Data

US 2005/0060074 A1    Mar. 17, 2005

(30) Foreign Application Priority Data

Dec. 3, 2002    (JP) .............................. 2002-350597

(51) Int. Cl.
*B62D 6/00* (2006.01)
*B62D 5/04* (2006.01)
*B62D 15/02* (2006.01)
*B62D 6/08* (2006.01)
*B62D 5/00* (2006.01)

(52) U.S. Cl. .................... 701/41; 701/42; 180/443; 180/446

(58) Field of Classification Search ............ 701/41, 701/42, 43; 180/443, 446, 402, 400, 412, 180/422; 280/5.51, 240; 318/466, 467, 318/446
See application file for complete search history.

(56) References Cited

U.S. PATENT DOCUMENTS

| | | | |
|---|---|---|---|
| 5,828,972 A | | 10/1998 | Asanuma et al. |
| 5,978,721 A | * | 11/1999 | Kagawa et al. ............... 701/41 |
| 6,239,568 B1 | * | 5/2001 | Sugitani et al. ............ 318/466 |
| 6,366,842 B1 | * | 4/2002 | Kaji et al. .................... 701/41 |
| 6,389,342 B1 | * | 5/2002 | Kanda .......................... 701/41 |
| 2002/0013646 A1 | | 1/2002 | Segawa et al. |
| 2003/0150666 A1 | * | 8/2003 | Ogawa et al. .............. 180/443 |

FOREIGN PATENT DOCUMENTS

DE    101 09 085    9/2002

(Continued)

OTHER PUBLICATIONS

European Search Report for EP 03 02 7691 completed on Nov. 18, 2004.

(Continued)

*Primary Examiner*—Thomas Black
*Assistant Examiner*—Christine M Behncke
(74) *Attorney, Agent, or Firm*—Darby & Darby

(57) ABSTRACT

The object of the present invention is to provide steering responsiveness and linear steering perception when the steering wheel is restored, even when there is excessive, sudden steering beyond a predetermined tolerance $(-\theta_E \leq \theta \leq \theta_E)$.

If a steering angle $\theta$ suddenly enters a "play" range at the left and right ends of the $\theta$–$X_n$ plane, the steering direction (turning direction/restoring direction) of the steering wheel can lead to a localized change in the gear ratio $(\partial X_n / \partial \theta)$. FIG. 3 is a graph showing an example of this type of hysteresis loop. When a driver tries to get out of the "play" range by turning the steering wheel in the restoring direction, a positive value can be achieved for the localized gear ratio based on the above hysteresis loop even in the "play" range. Thus, based on this arrangement, if the steering angle $\theta$ exceeds the tolerance range, the localized gear ratio can be prevented from being continuously 0 when the steering wheel is immediately turned in the restoring direction.

39 Claims, 25 Drawing Sheets

FOREIGN PATENT DOCUMENTS

| | | |
|---|---|---|
| JP | 02-182578 | 7/1990 |
| JP | 04-349068 | 12/1992 |
| JP | 04-349070 | 12/1992 |
| JP | 05-105100 | 4/1993 |
| JP | 10-287257 | 10/1998 |
| JP | 2001-334947 | 12/2001 |
| JP | 2003-81109 | 3/2003 |

OTHER PUBLICATIONS

Patent Abstracts of Japan for JP 05-105100 published on Apr. 27, 1993.

Patent Abstracts of Japan for JP 2001-334947 published on Dec. 4, 2001.

* cited by examiner

Steering Control

Turning Motor Control

| | $|y|$ | G | S | $\theta \cdot \Delta\theta$ |
|---|---|---|---|---|
| (a) | $\geq X_E$ | $=1$ | $=0$ | $\lesseqgtr 0$ |
| (b) | $>X_E$ | $<1$ | $=0$ | $\leq 0$ |
| (c) | $\leq X_E$ | $<1$ | $>0$ | $>0$ |
| (d) | $\leq X_E$ | $<1$ | $>0$ | $\leq X_E$ |

$(0 < G \leq 1, 0 \leq S)$

Update G

Optimization of Target Coordinates

Reaction Motor Control

STEERING CONTROL DEVICE

BACKGROUND OF THE INVENTION

The present invention relates to a steering control device equipped with a turning mechanism including a turning actuator driving a turning shaft whose position can be controlled and a steering angle sensor detecting a steering angle θ of a steering wheel.

The present invention is useful in various types of automotive steering control devices such as "steer-by-wire" systems and "variable gear ratio" systems.

Widely known examples of standard, conventional steer-by-wire systems include the technologies in Japanese patent publication number 2001-334947 and Japanese patent publication number Hei 5-105100 below.

FIG. 24 is a control block diagram illustrating the control system of a steering control device 900, which is a conventional steer-by-wire system.

The steering mechanism of the steering control device 900 is formed primarily from a steering shaft separated from a turning shaft 8, a steering wheel 1, a torque sensor 3 (steering torque sensor), a reaction motor 4 (steering actuator), a reaction control section 5, and the like.

The reaction control section 5 and the position control section 10A can be formed as separate processing devices (control devices) or as two control programs executed by a single processing device (control device). Also, the motor driver circuits (not shown in the figure) driving the motors 4, 6 can be installed at their respective motors or can be installed at the processing device (control device). These aspects of the structure can generally be designed freely.

The reaction control section 5 determines an instruction current in for the reaction motor 4 based on a steering torque τ output by the torque sensor 3 and an instruction current $I_n$ for the turning motor 6, which is determined by a predetermined feedback control (hereinafter referred to as a position control A) executed by the position control section 10A.

Also, the turning mechanism of the steering control device 900 is formed primarily from the position control section 10A, which executes the position control A described above, the steering angle sensor 2, the turning motor 6 (turning actuator), the position sensor 7 (turning displacement sensor), the turning shaft 8, the tires 9, and the like.

FIG. 25 is a control block diagram illustrating the control system of the position control section 10A of the conventional steering control device 900 described above. A turning instruction value calculating section 11A for executing the position control A determines an instruction value $X_n$ for the turning displacement of the turning shaft so that the value is roughly proportional to the steering angle θ. A PID control section 12 uses widely known PID control operations to determine an instruction current $I_n$ for the turning motor 6 based on the turning displacement instruction value $X_n$ and a turning displacement measurement value $X_a$. With this position control A, the orientation of the tires 9 is controlled so that a desired orientation is achieved.

In the control system described above, a large steering operation that causes the turning displacement instruction value $X_n$ to exceed an actual physical end position ($+/-X_E$), the instruction current $I_n$ will increase suddenly based on this excess. Since the action of the reaction control section 5 will lead to a sudden increase in the output torque (steering reaction) of the reaction motor 4 as well, there will naturally be a generated (simulated or emulated) virtual endpoint for the steering range even if there is no physical restriction (endpoint or abutment position) to the rotation range of the steering wheel 1.

In other words, in cases such as when there is no physical restriction (endpoint or abutment point) to the rotation range of the steering wheel 1, the conventional control system described above is useful in generating a virtual abutment counterforce (steering reaction) that prevents a steering angle θ from exceeding a threshold tolerance range ($-θ_E ≦ θ ≦ θ_E$).

However, in the conventional system described above, the virtual abutment counterforce (steering reaction) near the endpoints of a predetermined steering range is a force created by the increase of the instruction value $X_n$ in tandem with θ while the turning displacement $X_a$ is mechanically fixed at the end. When this counterforce is generated, the instruction current $I_n$ for the turning motor 6 can become very high. Thus, if this state continues for an extended period, the turning motor 6 may overheat and malfunction.

Thus, the conventional system described above can lead to obstacles to providing a compact and light design for the turning actuator (turning motor 6). As a result, the use of this conventional system will be inefficient in terms of production costs for automobiles, the degree of freedom made available in automobile design, performance of automobiles, and the like.

FIG. 1 is a control block diagram illustrating a control system of a steering control device 100 that includes a heating prevention function and that was developed to overcome the overheating problem described above. In this steering control device 100, the position control system of the turning shaft 8 is somewhat different from that of the position control section 10A of the steering control device 900 described above.

A position control section 10B shown in FIG. 1 includes a turning instruction value calculating section 11B shown in FIG. 2 in place of the turning instruction value calculating section 11A shown in FIG. 25. The position control (position control B) of the turning shaft 8 is implemented by the actions of the turning instruction calculating section 11B and the PID control section 12. The other elements such as the PID control section 12 are the same as described above.

FIG. 2 is a graph illustrating the calculations performed by the turning instruction value calculating section 11B of the steering control device 100. In this graph, $+/-X_E$ represents the tolerance range for turning displacement and is set according to the actual limit points for turning shaft displacement. If, for example, upper and lower limits for the turning displacement instruction value $X_n$ are guarded in this manner with a limiter or the like, excessive values for the instruction current $I_n$ for the turning motor 6 would be prevented, thus eliminating the heating problem described above.

However, when this type of guarding procedure is implemented, the actions of the PID control section 12 and the counterforce control section 5 will also restrict the output torque (turning counterforce) of the reaction motor 4, thus preventing the virtual steering range endpoints from being generated (simulated or emulated) as in the steering control device 900 shown in FIG. 24.

Also, since no abutment counterforce (steering counterforce) will be generated as in the steering control device 900, the steering wheel will be able to easily enter the regions indicated by the shading in FIG. 2. Thus, when the steering angle θ enters this "play" region, linear steering feel and turning responsiveness are decreased.

The object of the present invention is to overcome the problems described above. When the steering angle $\theta$ exceeds a tolerance range $(-\theta_E \leq \theta \leq \theta_E)$, a localized gear ratio $(\partial X_n/\partial\theta)$ is prevented from being continuously 0 during the subsequent return steering. This maintains steering responsiveness during this return steering.

Means for overcoming the above problems will be described.

According to first means of the present invention: in a steering control device equipped with: a turning mechanism including a turning actuator driving a position-controllable turning shaft; and a steering angle sensor detecting a steering angle $\theta$ of a steering wheel, a steering control device includes: a turning displacement sensor detecting a turning displacement X $(-X_E \leq X \leq +X_E)$ in the turning mechanism; and means for calculating a turning instruction value calculating an instruction value for a turning displacement in the turning mechanism based on the steering angle $\theta$. The turning instruction value calculating means includes means for generating hysteresis characteristics calculating, in exceptional situations where an absolute value $|\theta|$ of the steering angle $\theta$ exceeds a predetermined threshold value $\theta_E$ corresponding to an upper limit $X_E$ of the turning displacement X, the instruction value $X_n$ based on: a vertical axis coordinate corresponding to the steering angle $\theta$ on a predetermined hysteresis loop with one side being a section of a line $X_n = +-X_E$ on a $\theta-X_n$ plane; and a steering direction (steering direction/restoring direction) of the steering wheel.

The "line $X_n = +/-X_E$" referred to above indicates either a line $X_n = +X_E$ or a line $X_n = -X_E$. More specifically, when steering takes place to the left and steering exceeds the left-side endpoint, the former (line $X_n = +X_E$) applies. When steering takes place to the right and steering exceeds the right-side endpoint, the latter (line $X_n = -X_E$) applies. Also, the use of the "+–" expression below should be interpreted in this manner unless otherwise stated.

With the structure described above, if the steering angle $\theta$ suddenly enters a "play" region at the left or right end as shown in FIG. 2, a localized gear ratio $(\partial X_n/\partial\theta)$ can be changed according to the direction in which the steering wheel is turned (turning or restoring direction). FIG. 3 shows a graph illustrating an example of how this type of hysteresis loop is formed.

More specifically, when the driver turns the steering wheel in the restoring direction to come out of the "play" region, the gear ratio $(\partial X_n/\partial\theta)$ can be kept at a positive value even in the "play" region with the hysteresis loop described above.

Thus, with this structure, if the steering wheel is turned so that the tolerance range of the steering angle $\theta$ is exceeded $(-\theta_E \leq \theta \leq \theta_E)$, the localized gear ratio $(\partial X_n/\partial\theta)$ is prevented from being continuously 0 in the restorative steering that takes place immediately afterwards. As a result, steering responsiveness can be maintained during this restoring operation.

More specifically, with the present invention, a turning displacement that is roughly proportional to the steering amount can be immediately obtained when restoring the steering wheel, even if the steering status is within a "play" region shown in FIG. 2. Thus, even if the steering status is in this type of "play" region, safety based on linear steerability can be maintained.

Also, with the structure described above, a linear steering "feel" can be provided when the steering wheel is being restored, even if the steering angle $\theta$ suddenly enters a "play" region.

According to second means of the present invention, a steering mechanism including the steering wheel and the turning mechanism are mechanically separated, and an electrical coupling mechanism substitutes for a connecting mechanism connecting the steering mechanism and the turning mechanism.

More specifically, in a "steer-by-wire" system, the present invention provides extremely desirable advantages. In a steer-by-wire system that separates a steering mechanism including the steering wheel from the turning mechanism and that substitutes an electrical coupling mechanism for a connecting mechanism connecting the steering mechanism and the turning mechanism, the need to dynamically vary the gear ratio $(\partial X/\partial\theta)$ according to the automobile velocity or the like makes it necessary to also vary the effective steering range of the steering wheel (the steering angle range where the gear ratio is positive), i.e., the tolerance range $(-\theta_E \leq \theta \leq \theta_E)$ of the steering angle $\theta$. As a result, "play" regions will necessarily be generated outside of the tolerance range of the steering angle $\theta$ at least when the gear ratio is large.

Also, with standard steer-by-wire system steering wheels, endpoints for the rotation range, i.e., "ends" of the steering range where steering operations is blocked, are often not physically installed due to these factors. As a result, the present invention provides major advantages in steering control devices that involve these factors.

Third means of the present invention is as described in first or second means and further includes means for setting an endpoint setting a target coordinate for an endpoint $P_O$ that closes the hysteresis loop.

When the endpoint $P_O$ of the hysteresis loop reaches the opposite side past the origin (the diagonal quadrant), a situation develops where when the steering angle $\theta$ becomes 0 on the hysteresis loop, the turning displacement instruction value $X_n$ does not become 0. This means that the neutral point of the steering wheel is misaligned, and is an undesirable situation.

Also, as the hysteresis loop endpoint $P_O$ approaches the steering wheel rotation range endpoints $(+/-\theta_E)$, the effect of maintaining steering responsiveness gradually diminishes, as can be seen from FIG. 3. More specifically, as the endpoint $P_O$ approaches the entry point of the "play" region, the gear ratio $(\partial X/\partial\theta)$ when leaving the "play" region monotonically approaches 0, making it undesirable for the endpoint $P_O$ to be set up in the vicinity of the "play" region entry point. Also, the value of the gear ratio $(\partial X/\partial\theta)$ is closely associated with steering "feel", so it would be preferable to restore the relation between $\theta$ and $X_n$ to a normal state as quickly as possible when high responsiveness is not required. In this sense, therefore, a smaller hysteresis loop is better.

As described above, for example, suitable or optimal coordinates for the endpoint $P_O$ need to meet many conditions, and there are not a few conflicting trade-offs associated with these coordinates. Thus, in order to provide good steering responsiveness and "feel", it is extremely important to empirically determine endpoint $P_O$ coordinates that rationally meet these various conditions simultaneously.

With endpoint setting means described above, these types of suitable or optimal endpoint $P_O$ coordinates can be set up in the steering control device. This greatly assists in providing good steering responsiveness and "feel".

Fourth means of the present invention is as described in third means wherein the endpoint setting means includes means for varying a target point dynamically varying the target coordinate for the endpoint $P_O$ based on a steering velocity ω (=dθ/dt), a steering torque τ, the steering angle θ, the steering direction, or an automobile velocity v.

When a steering wheel restore operation is taking place in order to leave the "play" area, it is preferable to have a high gear ratio (∂X/∂θ) in cases of sudden avoidance operations. Also, in normal conditions where special suddenness is not involved, it would be preferable to restore the relation between θ and $X_n$ to the normal state as quickly as possible.

For example, the ideal coordinates of the endpoint $P_O$ on the θ–$X_n$ change according to the steering status. Since the steering status can be dynamically estimated based on steering velocity ω (=dθ/dt), steering torque τ, steering angle θ, steering direction, or the automobile velocity v, target point varying means described above can allow the target coordinates of the endpoint $P_O$ to be dynamically optimized for different steering status conditions.

Fifth means of the present invention is as described in any one of first means through fourth means wherein, in the hysteresis loop, all points except an origin on a horizontal axis of the θ–$X_n$ plane are outside the hysteresis loop.

As mentioned before, when the endpoint $P_O$ of the hysteresis loop passes the origin and reaches the opposite side (diagonal quadrant), the turning displacement instruction value $X_n$ will not be 0 when the steering angle θ on the hysteresis loop is 0. This leads to the neutral point of the steering wheel being misaligned and is not desirable. This type of problem can be avoided, however, if the hysteresis loop is formed so that all points on the horizontal axis of the θ–$X_n$ plane except for the origin are outside of the hysteresis loop.

However, if a dead zone (⊂ horizontal axis) near the origin, i.e., a non-responsive region where $X_n=0$, $∂X_n/∂θ=0$, is to be set up, the problem described above can be avoided by arranging the endpoint $P_O$ of the hysteresis loop at the endpoint (∈ horizontal axis) of the dead zone.

Sixth means of the present invention is as described in fifth means wherein, using a function f(θ) of the steering angle θ, symmetrical around the origin, and a correction gain G (0<G≦1), the hysteresis loop on the θ–$X_n$ plane is a closed curve formed from the line $X_n=+/-X_E$, a curve $X_n=f(θ)$, and a curve $X_n=Gf(θ)$.

The curve $X_n=f(θ)$, however, can be formed as a line or from line segments. The same goes for curve $X_n=Gf(θ)$. Also, the function f can be defined as an equation or can be implemented with a map (table data) and interpolation operations.

If the function y=f(θ) is a monotonically increasing function that is symmetrical around the origin and its domain is made adequately wide, the value of the correction gain G described above can be selected appropriately so that the hysteresis loop can be formed with the loop endpoint $P_O$ on the origin as described above. Also, the path, size, and the shape of the hysteresis loop can be selected continuously and freely using the correction gain G described above as a parameter.

More specifically, with the arrangement above, a small number of control parameters can be used to define or control the path, size, and shape of the hysteresis loop on the θ–$X_n$ plane.

Seventh means of the present invention is as described in sixth means and further includes means for calculating correction gain calculating a value for the correction gain G based on the upper limit $X_E$ and the function f(θ).

For example, the equation of a line that overlaps with path (a) in FIG. 3 is assumed to be y=f(θ)=aθ. Then, by setting the turning point in the "play" region in FIG. 3, i.e., the horizontal axis coordinate of the starting point of path (c), to $θ_R$ and the correction gain value to $G=X_E/|f(θ_R)|$, the curve $X_n=Gf(θ)$ described above becomes a line that connects the starting point of the turning point and the origin. In other words, in this case the endpoint $P_O$ of the hysteresis loop matches the origin.

More generally, the function y=f(θ) does not necessarily have to be a line. The only conditions that must be met are that it be a monotonically increasing function that is symmetrical around the origin and that its domain is adequately wide, as described above. Thus, correction gain calculating means described above is extremely useful in determining a turning point path for the most simple and basic hysteresis loop.

Eighth means of the present invention is as described above in sixth means or seventh means wherein the function f(θ) is a quadratic equation of the steering angle θ.

For example, if the function f is set up as a quadratic equation of θ, as in "y=f(θ)=a(|θ|+b)θ, a>0, b>0", then the gear ratio (∂X/∂θ) is relatively limited in the vicinity of the neutral point. This makes it possible to provide a relatively stable steering "feel" in the vicinity of the neutral point. The function f can, for example, be determined in this manner.

Ninth means of the present invention is as described in any one of sixth means through eighth means wherein the function f(θ) can be expressed as "f(θ, v)=θ∘g(θ, v)" where the function g(θ, v) is a function of automobile velocity v or the steering angle θ and has as a factor the steering angle θ.

Setting up the function f in this manner is convenient because it always passes the origin. Also, by making the function f dependent on the automobile velocity v and by setting up this dependency in an appropriate manner, it is possible to meet various demands, e.g., dynamically varying the gear ratio (∂X/∂θ) according to the automobile velocity.

Tenth means of the present invention is as described in any one of sixth means through ninth means further including means for asymptote normalization monotonically increasing the correction gain G(0<G≦1) in a dynamic manner based on a steering amount S, a steering status, a turning amount Z, or a turning status after initiation of restorative steering having as a starting point the line $X_n=+/-X_E$.

With this type of arrangement, the size, the turning-point path, and the shape of the hysteresis loop on the θ–$X_n$ plane can be dynamically and freely changed. Also, the position of the endpoint $P_O$ of the hysteresis loop can be dynamically and freely changed as well. However, if the value of the correction gain G is to be changed, it would be preferable in terms of generating a natural steering "feel" to change the correction gain G in a monotonic or continuous manner as much as possible.

For example, if, as mentioned previously, the equation of a line that overlaps with the path (a) in FIG. 3 is set to y=f(θ)=aθ, the horizontal coordinate of the turning point in the "play" region in FIG. 3, i.e., starting point of path (c), is set to θR, and the correction gain value is set to $G=X_E/|f(θ_R)|$, the curve $X_n=Gf(θ)$ becomes a line connecting the starting point of the restoring and the origin. Thus, in this case, the equation of the restoring path (c) is provided by the line $X_n=Gf(θ)$, and the endpoint $P_O$ of the hysteresis loop matches the origin.

In this type of situation, monotonically increasing the correction gain value $G=X_E/|f(θ_R)|$ to gradually approach 1 as the point (θ, $X_n$) on the hysteresis loop moves along the restoring path (c) results in the restoring path (c) becoming a downwardly projecting curve and the endpoint $P_O$ shifting to the right of the origin as the correction gain G dynamically increases. If θ<0, the same applies except everything is converted to be symmetrical around the origin. For example, if the hysteresis loop is to be made small, the correction gain G can be made to approach 1 as the displacement along the restoring path (c) (or the steering amount S described above) increases. The more quickly the correction gain G converges to 1, the smaller the hysteresis loop will be.

Thus, for example, with this type of means, the path, size, and shape of the hysteresis loop on the $\theta$-$X_n$ plane can be dynamically and freely controlled with a small number of control parameters.

Eleventh means of the present invention is as described in tenth means wherein the asymptote normalizing means includes means for varying an asymptote rate using a steering velocity $\omega$ (=$d\theta/dt$), a steering torque $\tau$, the steering angle $\theta$, the steering direction, or an automobile velocity v, in order to dynamically change an asymptote rate A (≡dG/dS) for the steering amount S of the correction gain G or an asymptote rate B (≡dG/dZ) for the turning amount Z of the correction gain G when the correction gain G (0<G≦1) is being monotonically increased in a dynamic manner.

As the observations above indicate, the hysteresis loop can be made smaller the larger the asymptotic rate A(≡dG/dS) is. Thus, by changing this value dynamically, the shape, the position, and the length of the restoring path (c) can be changed dynamically. Or, the position of the endpoint $P_O$ can be dynamically optimized. However, this requires caution since making the asymptotic rate A too big can result in a negative value for the gear ratio ($\partial X/\partial\theta$).

These issues also apply when the rate of increase of the correction gain G is controlled using the asymptotic rate B(≡dG/dZ) instead of the asymptotic rate A(≡dG/dZ).

If, as a result of some operation, the gear ratio ($\partial X/\partial\theta$) can become a negative value, it would be preferable to handle these situations by optimizing the length of the control interval or by performing smoothing operations or the like. Also, temporary (instantaneous) negative values in the gear ratio ($\partial X/\partial\theta$) caused by fine vibrations in the automobile or the reaction motor or the like can sometimes be prevented using standard, widely known noise-handling techniques or the like.

Twelfth means is as described in any one of first means through eleventh means further including means for varying a steering angle threshold dynamically changing upper and lower limits of a predetermined tolerance range ($-\theta_E \leq \theta \leq \theta_E$) of the steering angle $\theta$ based on an automobile velocity v.

The operations and advantages of the present invention according to this aspect will be described in detail in the section on the fourth embodiment below.

Thirteenth means is as described in any one of first means through twelfth means wherein the steering mechanism includes means for generating endpoint reactions generating, at a vicinity of an upper limit position $\theta_E$ of the steering angle $\theta$ and at a vicinity of a lower limit position $-\theta_E$ of the steering angle $\theta$, a virtual abutment resistance restricting the steering angle $\theta$ from exceeding a predetermined tolerance range ($-\theta_R \leq \theta \leq \theta_E$), based on the steering angle $\theta$, the turning displacement X, or an instruction value $X_n$ for the turning displacement X.

The operations and advantages of the present invention according to this aspect will be described in detail in the section on the fourth embodiment below.

With these aspects of the present invention, the problems described above can be effectively or rationally overcome.

The above, and other objects, features and advantages of the present invention will become apparent from the following description read in conjunction with the accompanying drawings, in which like reference numerals designate the same elements.

LIST OF DESIGNATORS

Figure 1:
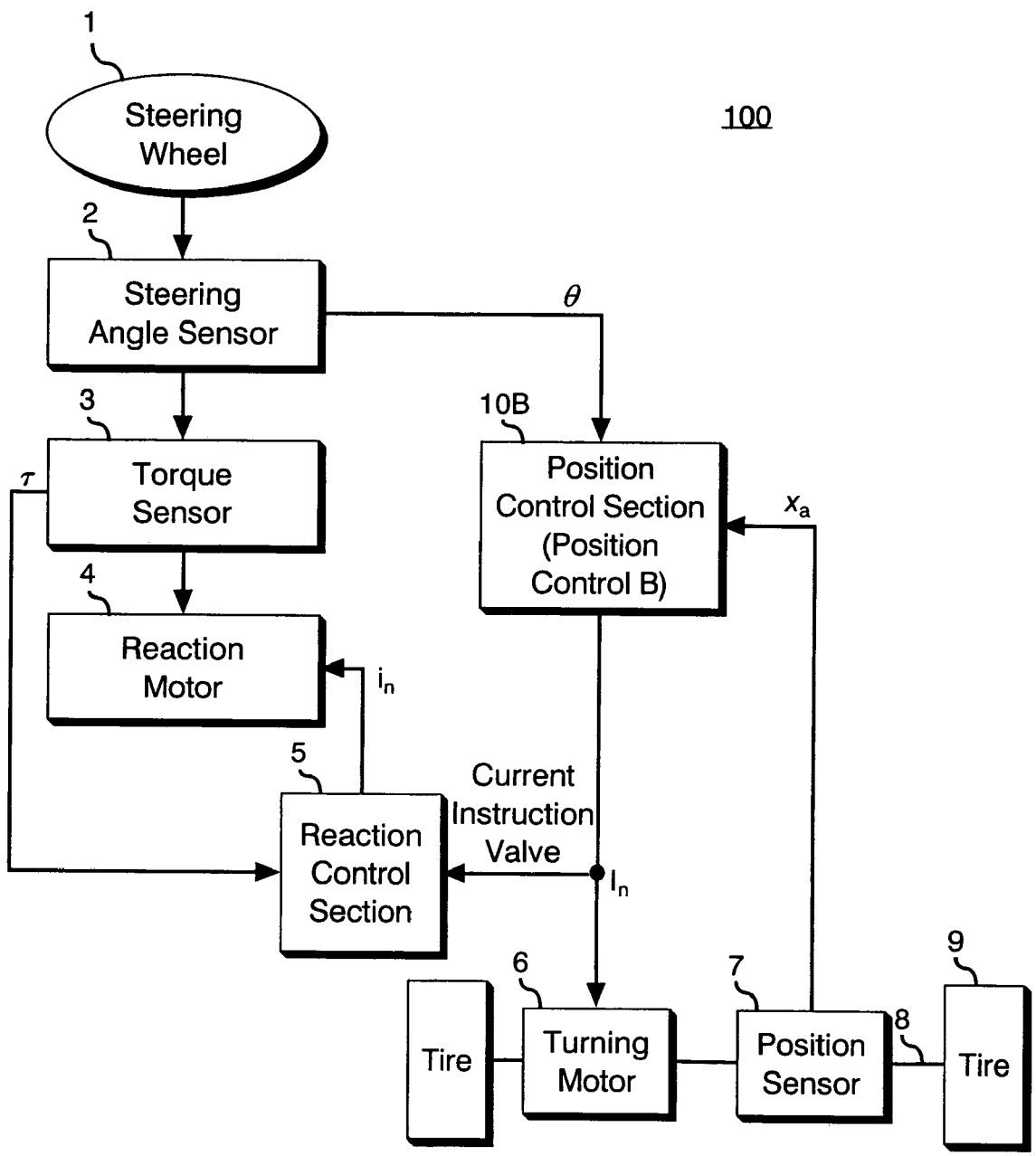
FIG. 1 is a control block diagram illustrating a prior art the control system of a steering control device including a heat prevention function.

100, 200, 300, 400, 500: steering control device
1: steering wheel
2: steering angle sensor
3: torque sensor (steering torque sensor)
4: reaction motor (steering actuator)
5: reaction control section
6: turning motor (turning actuator)
7: position sensor (turning displacement sensor)
8: turning shaft
9: tire
10A: position control section performing position control A
10B: position control section performing position control B
10C-j: position control section performing hysteresis control (j=1, 2, 3, 2')
11A: turning instruction value calculation section (for position control A)
11B: turning instruction value calculation section (for position control B)
11C-j: turning displacement reference value calculation section
21, 22, 23: turning instruction value calculation section
31, 32, 33: hysteresis characteristic generation section
$\theta$: steering angle
$\theta_E$: upper limit of steering angle tolerance range
$X_a$: turning displacement (measurement value)
$X_n$: turning displacement instruction value
$X_E$: upper limit of turning displacement tolerance range
y: turning displacement reference value
G: correction gain
A: asymptotic rate
f: function of y
$P_O$: endpoint closing hysteresis loop
$\gamma$: target value of horizontal axis coordinate for point $P_O$
S: steering amount after restore steering is begun with starting point at $X_n = +/- X_E$
$\Delta\theta$: change in steering angle $\theta$ over n control intervals $(1 \leq n)$
v: automobile velocity
$\tau$: steering torque
$\omega$: steering velocity (=d$\theta$/dt)
h: function determining upper limit $\theta_E$ of steering angle based on automobile velocity v
$I_n$: instruction current for turning actuator (turning motor 6)
$i_n$: instruction current for turning actuator (reaction motor 4)
$i_1$: basic term (first term) of instruction current $i_n$
$i_2$: end reaction generation current (second term of instruction current $i_n$)

DETAILED DESCRIPTION OF THE PREFERRED EMBODIMENTS

Embodiments of the present invention will be described. The present invention, however, is not restricted to these embodiments.

First Embodiment

Figure 4:
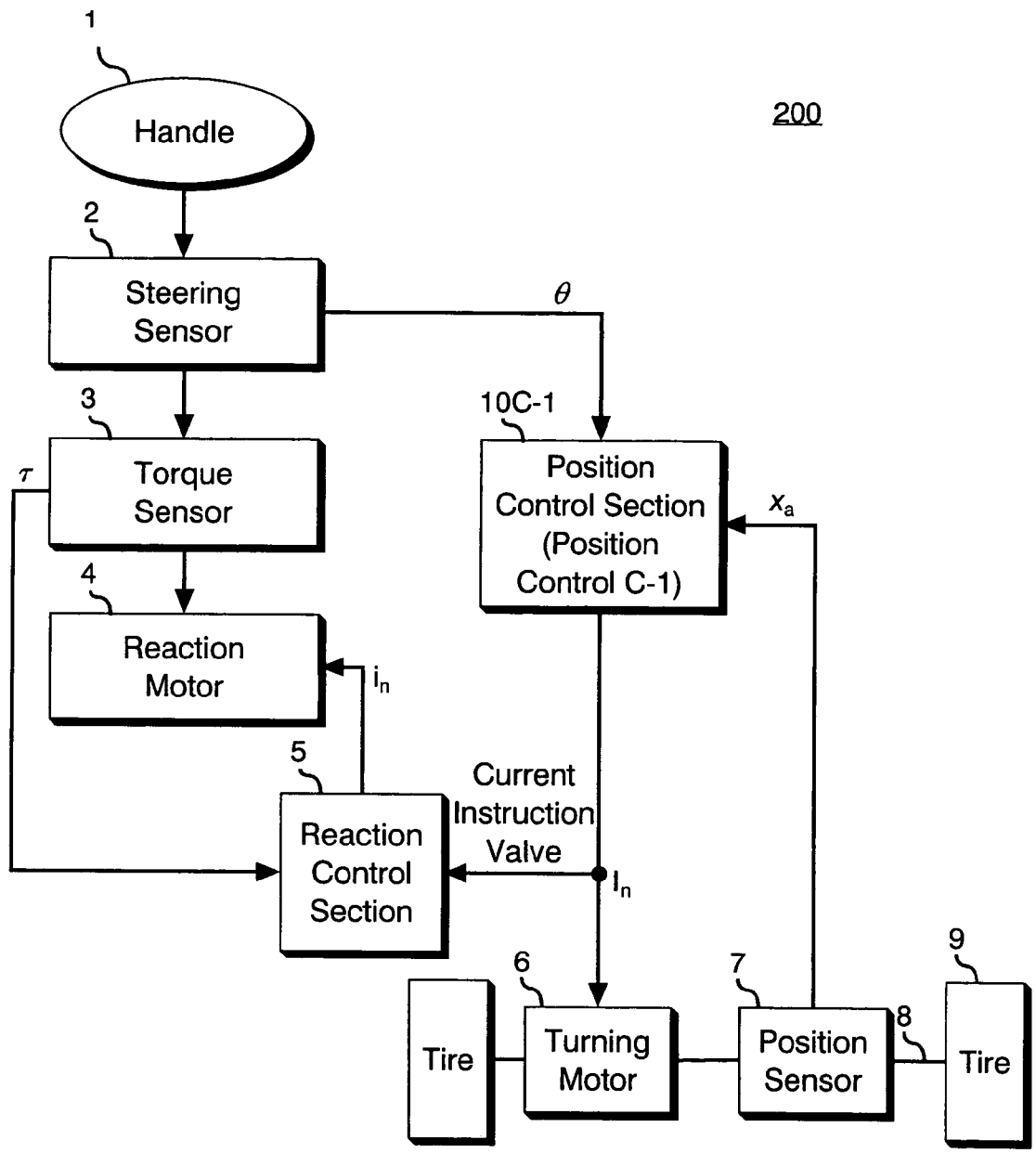
FIG. 4 is a control block diagram illustrating the overall and basic control system of a steering control device according to a first embodiment of the present invention.
Figure 25:
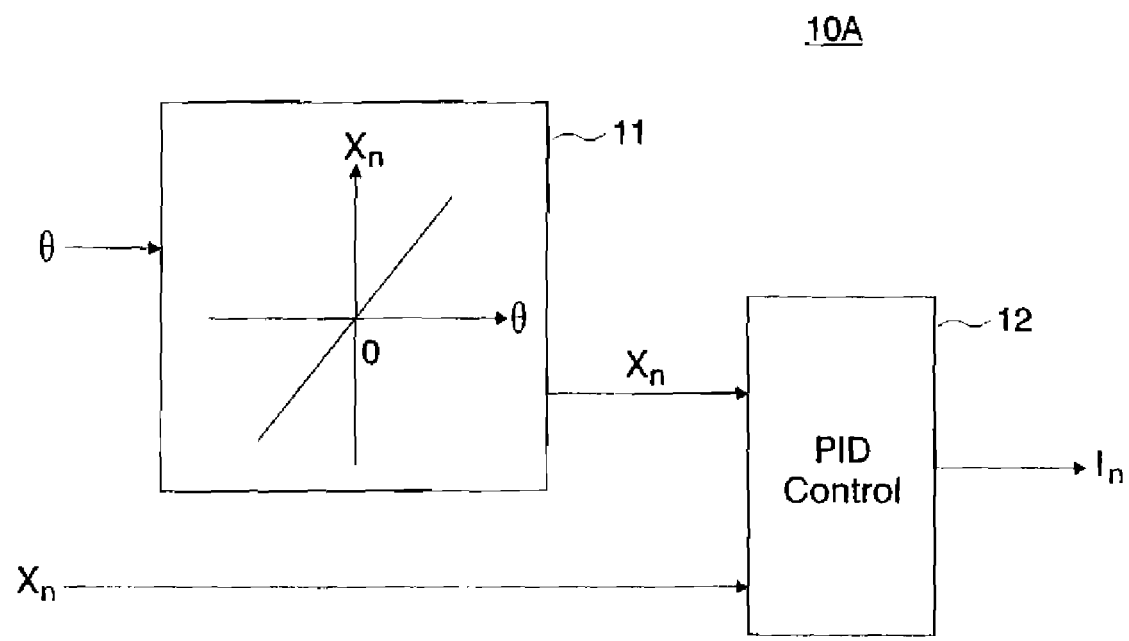
FIG. 25 is a control block diagram showing a control system for a position control A (10A) of a conventional steering control device.

FIG. 4 is a control block diagram illustrating the overall and basic control system of a steering control device 200 according to a first embodiment. Roughly similar to the steering control device 100 described above and the steering control device 900 described above, this steering control device 200 performs position control for the steering shaft 8 through the actions (output of the instruction current $I_n$) of the PID control section 12, an example of which is shown in FIG. 25 described above.

However, this steering control device 200 is also equipped with hysteresis characteristic generating means which is the most significant feature of the present invention. This is the major difference of the steering control device 200 from the steering control device 100 and the steering control device 900. More specifically, the position control section 10C-1 of the steering control device 200 in FIG. 4 calculates the instruction value $X_n$ for a turning instruction to the turning motor 6 using hysteresis characteristic generating means (FIG. 6: turning instruction value calculating section 21). The series of control operations performed by the position control section 10C-1 to output the instruction value $I_n$ using $\theta$, $X_a$, and the like may hereinafter be referred to as "position control C-1" or simply "turning motor control" or the like.

Figure 5:
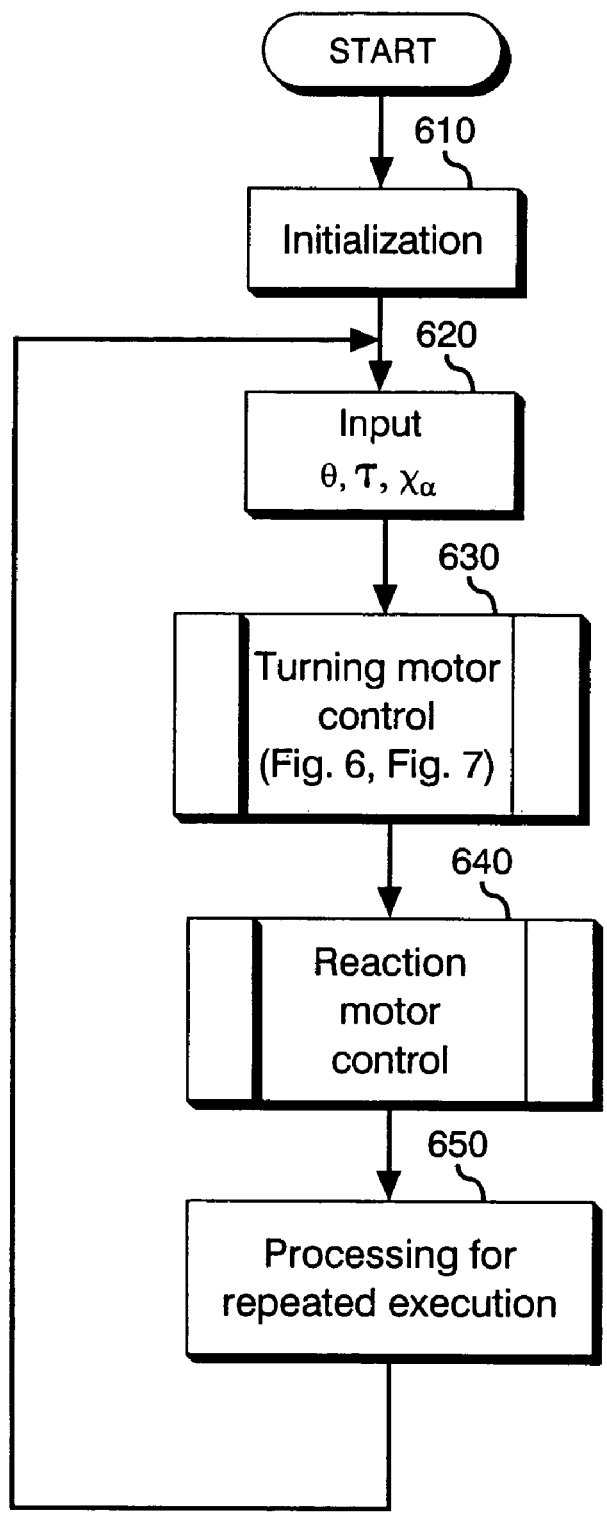
FIG. 5 is a flowchart showing the overall and basic control procedure for a steering control device.

FIG. 5 is a flowchart showing the overall and basic control operations performed by the steering control device 200.

In these steering control operations, first, step 610 performs system initialization. This initialization mainly involves initializing control variables, initializing timer interrupt control needed for periodic and repeated operations, and the like.

Next, at step 620, various detection results (e.g., steering angle $\theta$, steering torque $\tau$, turning displacement $X_a$, vehicle velocity v) are received from sensors such as a steering angle sensor 2, a steering torque sensor 3, a turning displacement sensor 7, and a vehicle velocity sensor and the like not shown in the drawings.

At step 630, a subroutine for performing turning motor control (FIG. 7) is called and executed. This subroutine implements the position control section 10C-1, which executes the position control C-1, shown in FIG. 4.

Figure 6:
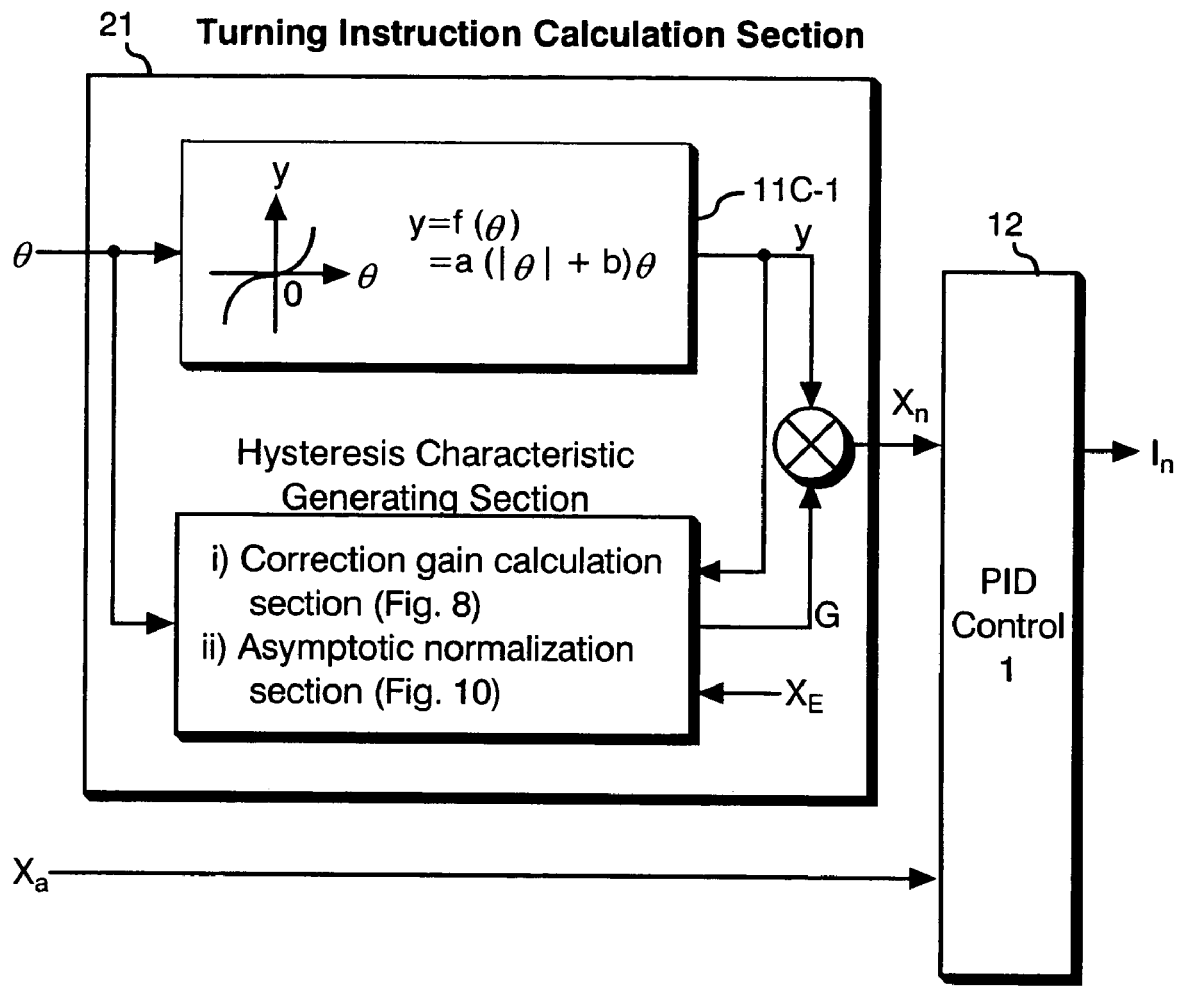
FIG. 6 is a control block diagram illustrating a control system for a position control section 10C-1 performing turning motor control using hysteresis control.

FIG. 6 shows a control block diagram of the control system of the position control section 10C-1, which performs turning motor control through hysteresis control.

Figure 2:
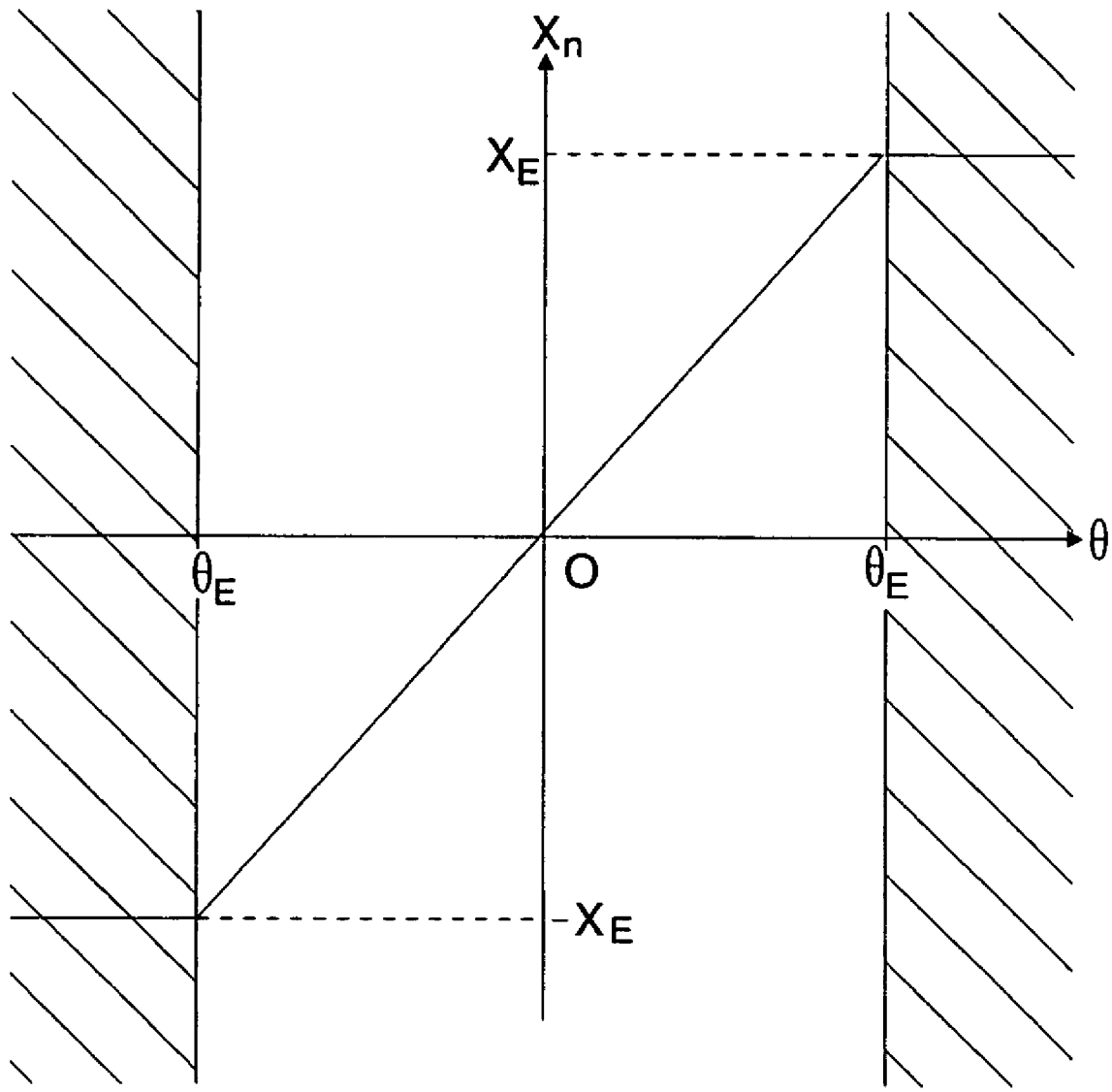
FIG. 2 is a graph showing a prior art calculation system for a turning instruction value calculation section 11B of a steering control device.

Instead of the turning instruction calculation section 11A shown in FIG. 25 or the turning instruction calculation section 11B shown in FIG. 2 or the like, calculations are performed by the control block 11C-1 shown in FIG. 6 to determine a variable y based on the following equation (1).

$$y = f(\theta) = a(|\theta| + b)\theta \quad (1)$$

For example, an equation such as this one where the value of the variable of y relative to the steering angle $\theta$ is expressed as a quadratic equation of $\theta$ can be used. In other words, by setting the variable y to a value that is symmetrical around the origin and approximates the following equation (2), a steering control device can be provided with relatively gradual turning responsiveness at positions near the midpoint.

$$dy/d\theta = a_1 + a_2|\theta| \quad (2)$$

Of course, the variable y described above can be implemented through mapping (table data) of a monotonically increasing function with interpolation or the like.

Other aspects of the turning instruction value calculating section 21 in FIG. 6 will be described in detail later using FIG. 8 and the like.

Figure 7:
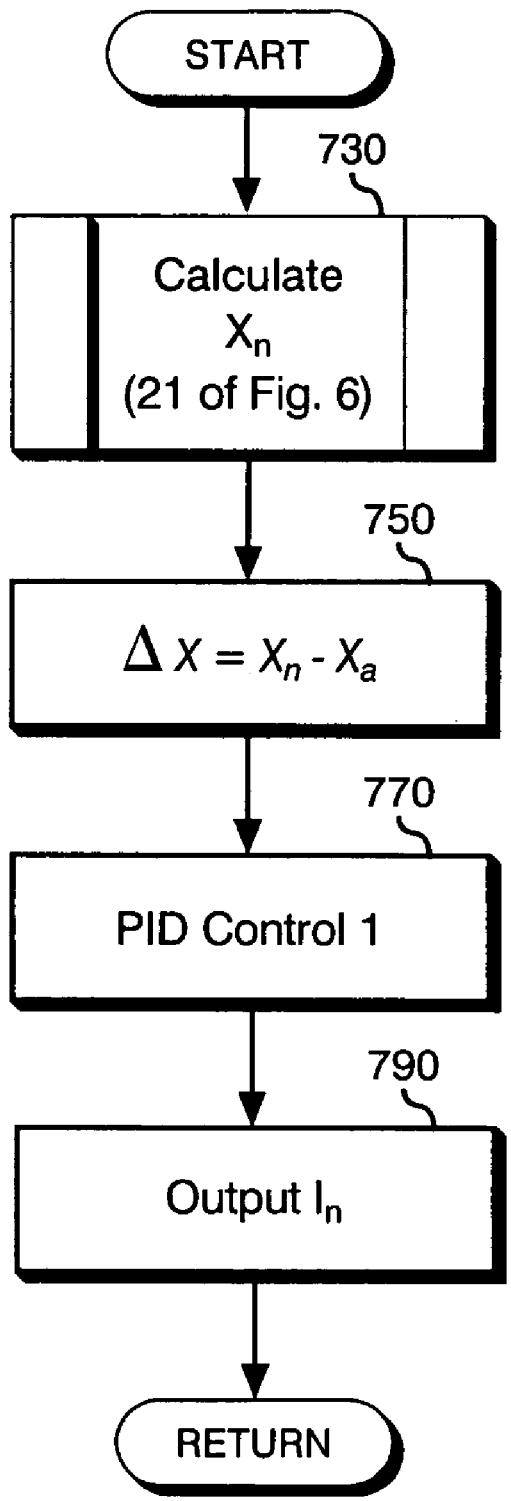
FIG. 7 is a flowchart illustrating a control procedure of a position control section performing turning motor control using hysteresis control.

FIG. 7 shows an example of operations performed in the turning motor control operation (the control operation called at step 630) in FIG. 5 and FIG. 6. The flowchart in FIG. 7 shows an overview of the position control C-1 executed by the position control section 10C-1 shown in FIG. 4 and FIG. 6. The hysteresis control and the like which are major characteristics of the present invention are executed also within a subroutine called at step 730 in FIG. 7.

More specifically, in step 730 of this subroutine, the turning instruction value calculation section 21 (FIG. 6) implemented based on FIG. 8 and the like, described later, determines a turning displacement instruction value $X_n$.

Next, at step 750, the execution results of step 620, described above, and step 730 are used to determine a differential $\Delta X(=X_n-X_a)$ between the turning displacement instruction value and measurement value.

At step 770, a predetermined proportional-plus-integral-plus-derivative control (this is hereinafter referred to as PID control 1) relating to this differential $\Delta X$ is executed.

This proportional-plus-integral-plus-derivative control (PID control 1) will be described.

PID Control 1:

In this proportional-plus-integral-plus-derivative control, a current instruction value $I_n$ for the turning motor 6 is calculated based on the well-known equation (3) below. In the equation, coefficients $b_1$, $b_2$, $b_3$ are constants that have been tuned to provide appropriate results.

$$I_n = b_1 \Delta X + b_2 \int \Delta X dt + b_3 d(\Delta X)/dt \quad (3)$$

Then, at step 790, the current instruction value $I_n$ calculated by this PID control 1 is output to a turning motor drive circuit not shown in the figures and the reaction control section 5 from FIG. 5.

When this turning motor control operation (FIG. 7) is completed, control returns to the caller of this subroutine (step 640 in FIG. 5).

Then, at step 640 (reaction motor control) in FIG. 5, a predetermined proportional-plus-integral-plus-derivative control (hereinafter referred to as PID control 2) operation is performed.

This proportional-plus-integral-plus-derivative control operation (PID control 2) will be described.

PID Control 2:

In this proportional-plus-integral-plus-derivative control operation, a current instruction value $i_n(=i_1)$, which is a current instruction for the reaction motor 4 in FIG. 4, is calculated according to equation (4) below. In this equation, coefficients $c_1$, $c_2$, $c_3$, $c_4$, $c_5$, $c_6$ are constants that have been tuned to provide appropriate results.

$$i_n = i_1 \quad (4)$$
$$= -c_1 \tau - c_2 \int \tau dt - c_3 d\tau/dt - c_4 I_n - c_5 \int I_n dt - c_6 dI_n/dt$$

With this PID control 2, the current instruction value $i_n$ ($=i_1$) for the reaction motor 4 is calculated.

Finally, at step 650 in FIG. 5, a timer interrupt reservation set-up operation or the like is performed and a timer interrupt standby state is entered so that the operations starting with step 620 are preformed periodically (e.g., at 0.5 ms intervals).

The turning instruction value calculation section 21 (FIG. 6) for the position control section 10C-1, which is the most important characteristic of the present invention, will be described in further detail.

Figure 8:
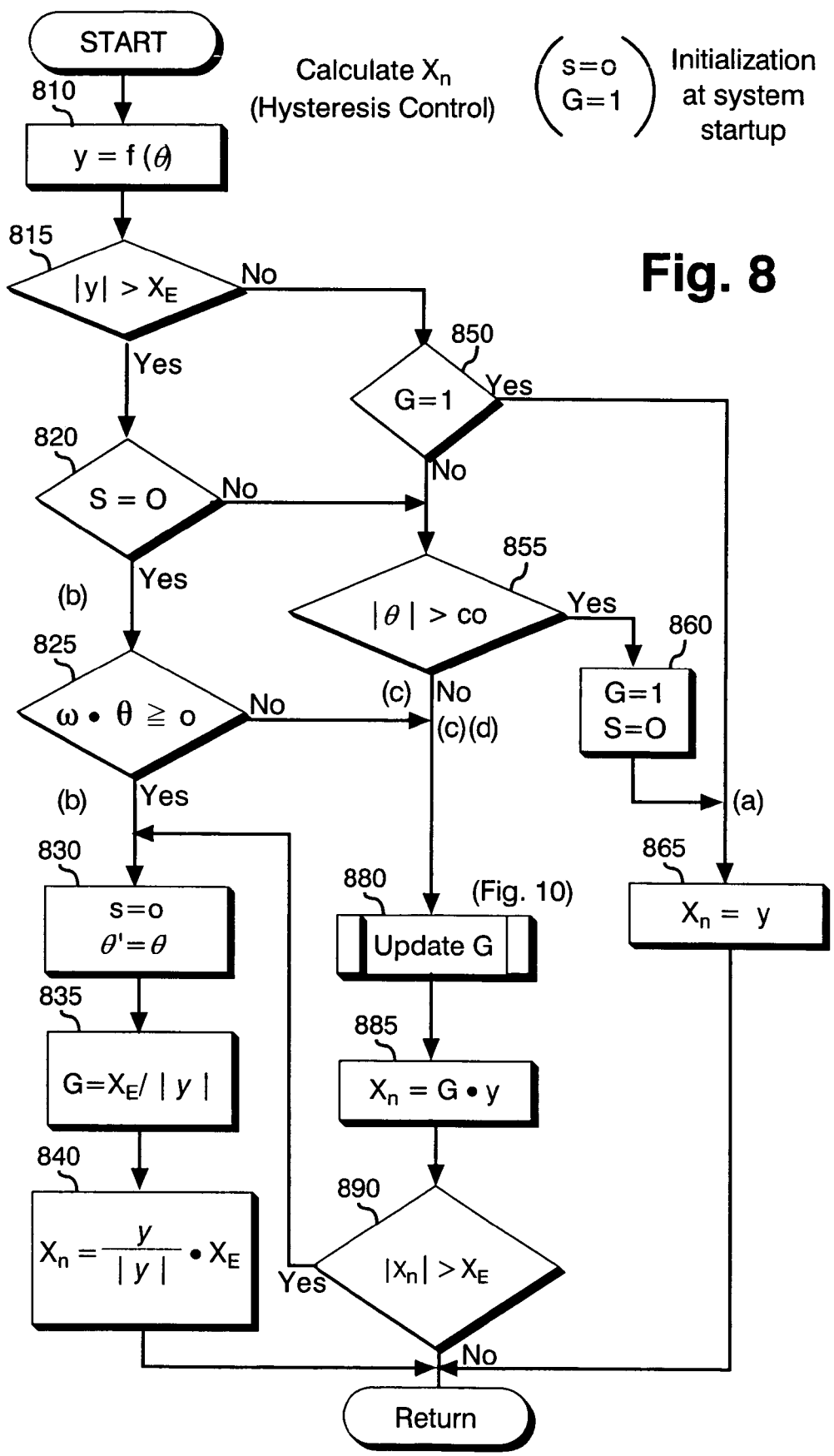
FIG. 8 is a flowchart illustrating a control procedure performed by a turning instruction value calculation section 21 of a position control section 10C-1.

FIG. 8 is a flowchart showing control operations performed by the turning instruction calculation section 21 (FIG. 6) for the position control section 10C-1, which is the most important characteristic of the present invention.

Step 610 in FIG. 5, described above, performs system start-up initialization for this subroutine, which calculates an instruction value $X_n$ for the turn displacement X. Important initialization values include "S=0" and "G=1". Of course, the variable S represents "the amount of steering after restore steering is begun with starting point at line $X_n=+/-X_E$", and the variable G indicates the correction gain. The method used for calculation (updating) of the variable S will be described in detail later using FIG. 10.

In this program, step 810 first determines the value of variable y according to the equation (1) described above. At step 815, the absolute value of the variable y and the upper limit $X_E$ of the turning displacement instruction value $X_n$ are compared.

Step 820 checks the turning amount S to see whether or not it is 0.

Figures 9A, 9B:
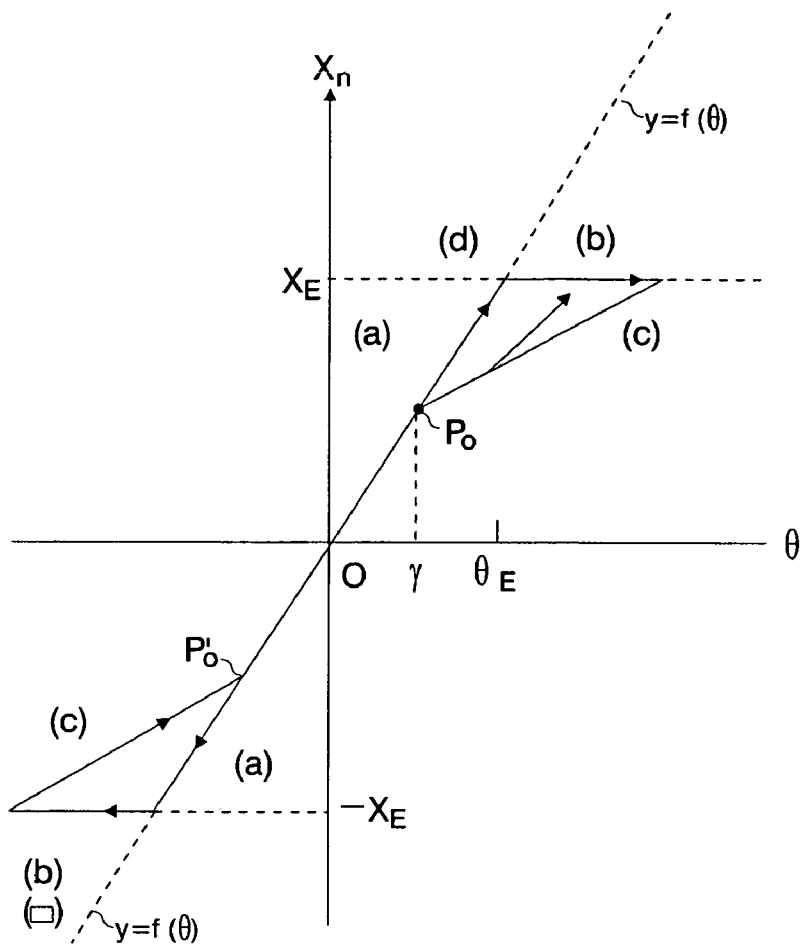
FIG. 9 is a drawing for the purpose of describing the operations performed in the flowchart in FIG. 8 of a first embodiment.

FIG. 9 is a drawing for the purpose of describing the operations performed by the first embodiment in the flowchart in FIG. 8. The variable S, which is the steering amount originating at line $X_n=+/-X_E$ and starting when restore steering was begun, has a value of 0 along path (a) and path (b).

At step 825, the sign of the product $\omega \circ \theta$ of the steering angle velocity $\omega$ and the steering angle $\theta$ is determined. The point at which the turning angle velocity $\omega$ is calculated is not critical. For example, in this first embodiment, the value of the steering angle velocity $\omega$ is determined using differential calculations performed immediately before the turning instruction value calculating section 21 begins its operations. The location of this operation is not indicated in the flowchart in FIG. 5 but would correspond to a step between step 620 and step 630 in FIG. 5.

At step 830, the variable S is reset (S=0) and the turning angle $\theta$ is saved ($\theta'=\theta$).

At step 835, the correction gain G is calculated according to the equation "$G=X_E/|y|$". Due to operations at step 815, step 890, and the like, the denominator $|y|$ will never be 0.

At step 840, the correction gain G is calculated based on the following equation (5). Since (y/|y|) is used simply to determine the sign of the variable y, the specific division operation of the variable y does not necessarily need to be performed in practice.

$$X_n = (y/|y|)X_E \quad (5)$$

With this operation, when the steering angle $\theta$ goes outside the tolerance range at path (b), boundary values $+/-X_E$ are set up for the turning displacement instruction value $X_n$.

Step 850 checks to see if the correction gain G has a value of 1. If G=1, there is no need to perform hysteresis control at that point, e.g., as can be seen from FIG. 9. Thus, at step 865, an instruction value is calculated using the conventional method according to the following equation (6).

$$X_n = y \quad (6)$$

If, at step 850, G is not 1, then step 855 determines the magnitude of the absolute value |θ| of the steering angle θ. This evaluation is performed to determine if the steering angle is near the origin or not. C0 is a constant suited for defining a range for the area near the origin. Then, if θ is near the origin, step 860 forces the correction gain G back to 1 and resets the steering amount to 0. As a result, the hysteresis loop reaches the endpoint $P_O$, bringing the hysteresis loop to conclusion. This is the first condition for concluding the hysteresis loop.

Figure 10:
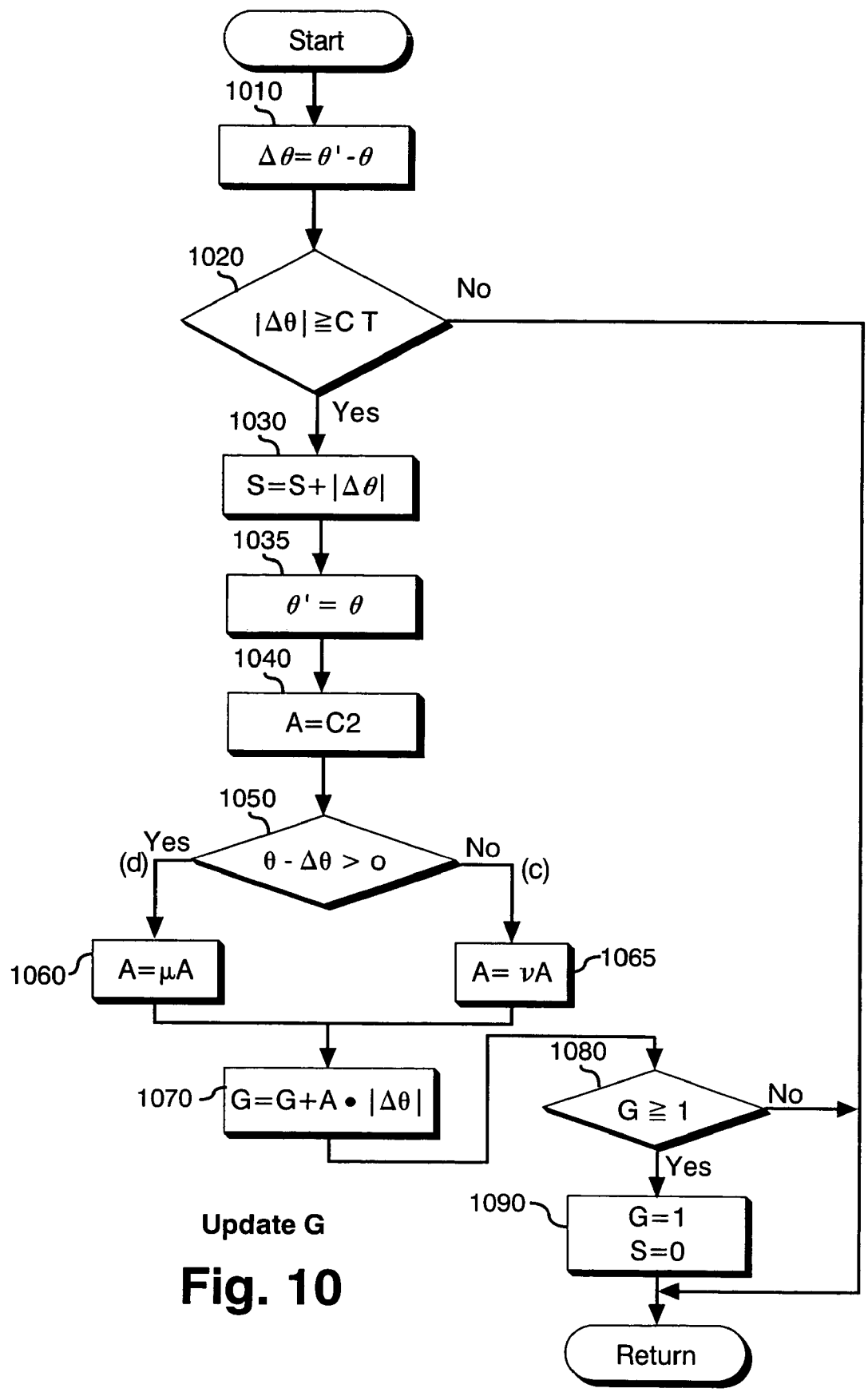
FIG. 10 is a flowchart illustrating a control procedure of an "update G" subroutine (i.e., means for asymptote normalization and means for varying asymptotic rate) in FIG. 8 of a first embodiment.

If the conditions described above do not apply, then the remaining cases must fall under the path (c) or the path (d). In these cases, the correction gain is updated as described later (FIG. 10). This updating operation provides dynamic optimization of the correction gain G. Then, at step 885, an instruction value is calculated according to the following equation (7).

$$X_n = G \circ y \quad (7)$$

However, if this turning displacement instruction value $X_n$ is calculated and the absolute value of $X_n$ exceeds the upper limit $X_E$, the operation at step 890 is performed and control is returned to step 830, where the series of operations for path (b) are performed again. This case corresponds to when the path (d) is extended and reaches the line $X_n = +/- X_E$.

With the evaluation and updating operations according to FIG. 8 and FIG. 9 as described above, categorization to paths (a), (b), (c), (d) on a hysteresis loop is performed and an instruction value $X_n$ for each path is calculated for each control interval.

FIG. 10 is a flowchart showing the control operations performed for the "update G" subroutine (i.e., asymptotic normalizing means and asymptotic rate varying means) in FIG. 8 of this first embodiment. In this subroutine, the value of correction gain G initially determined at step 835 in FIG. 8, described above, is monotonically increased to 1. However, when the steering angle θ reaches to a range close to the origin, the operation at step 855 in FIG. 8, described above, results in G being set back to 1 at step 860.

In this "update G" subroutine, a steering amount increase Δθ is calculated at step 1010. This steering amount increase Δθ is the increase in steering from the previous control interval executed at step 830 to the current control interval. Alternatively, it is the increase from the previous control interval executed at step 1035, described later, to the current control interval.

Step 1020 determines whether the absolute value of this increase Δθ is at least a predetermined constant C1 (>0). This evaluation is included to eliminate negative factors such as fine vibrations caused by uneven road surfaces, the engine in the automobile, the motor, and the like, electromagnetic noise and the like, and calculation errors caused by steering angle θ detection precision, calculation methods, calculation precision, and the like. By selecting an appropriate constant C1, it is possible to avoid undesirable situations where the steering wheel is almost completely still but there continues to be an increase in the cumulative value S of the absolute value of the increase Δθ. A suitable setting for the constant C1 can be, for example, 1°~4°.

At step 1030, the cumulative value S described above is calculated. This cumulative value S corresponds to the "steering amount originating at line $X_n = +/- X_E$ and starting when restore steering was begun". At step 1035, the steering amount θ for this control interval is saved in the variable θ'. At step 1040, the asymptotic rate A (≡dG/dS) described above is set up. In this embodiment, the constant C2 (>0) is substituted for the asymptotic rate A. A suitable setting can be, for example, a value of about 0.001/degree.

Next, at step 1050, the steering direction (turning/restoring) is determined. For example, referring to FIG. 9, if the θ∘Δθ value is positive, the steering direction is determined to be in the turning direction (path (d)). Otherwise, it is assumed to be in the (path (c)) direction. Then, at step 1060, the asymptotic rate A is multiplied by μ. At step 1065, the asymptotic rate is multiplied by ν and variable A is reset to this value (asymptotic rate varying means). A suitable setting for μ(≦0) can be, for example, around 1~3, and a suitable setting for ν (≧0) can be, for example, around ½~1. Asymptotic normalizing means of the present invention is implemented when either one of μ or ν takes a positive value.

If both μ and ν are set to 0, there is no need to execute step 1040-step 1090 of this subroutine. The operations and advantages of the present invention described later are still provided, however, even when execution of step 1040-step 1090 in FIG. 10 is skipped (omitted).

At step 1070, the value of the correction gain G is increased by A∘|Δθ| (asymptotic normalizing means). However, if the value of the correction gain G reaches a value of at least 1, G is forcibly set to 1 and S is forcibly set to 0 as in step 860 described previously. With this operation, the hysteresis loop reaches the endpoint $P_O$, completing the hysteresis loop. This is the second condition for completing the hysteresis loop.

With this hysteresis control, when the steering wheel is being restored, the a turning displacement roughly proportional to the steering amount can be immediately obtained even if the steering state is within the "play" regions at the left and right ends. Even if the steering state has entered this type of "play" region, safety based on linear steerability is maintained.

With the structure described above, linear steerability can be provided during steering wheel restoring even if the steering angle θ has entered this "play" region. Furthermore, the steering state can be gradually and smoothly brought back to a normal state (path (a)).

Figure 11:
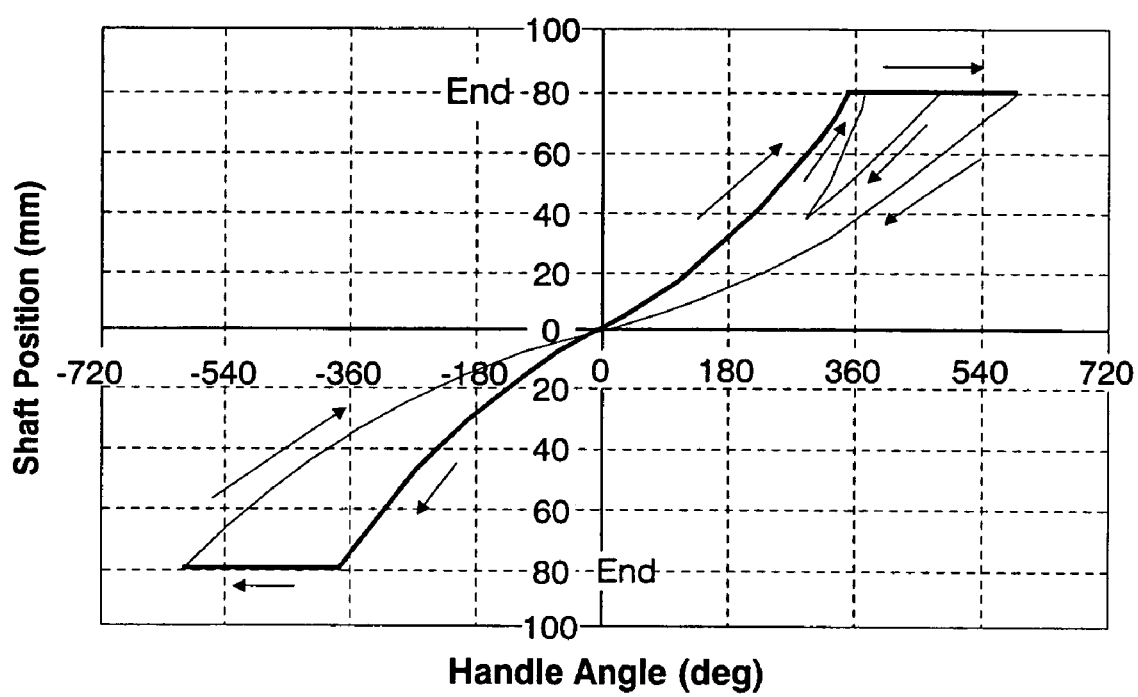
FIG. 11 is a graph showing operations and advantages of a first embodiment.
Figure 12:
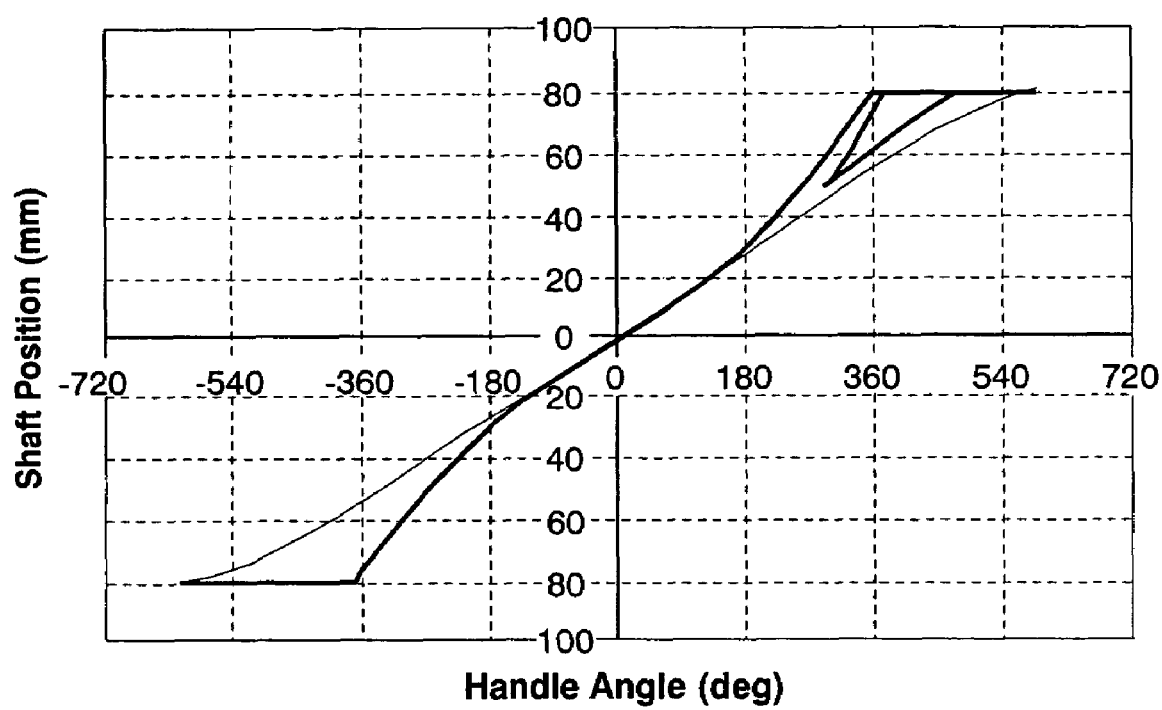
FIG. 12 is a graph showing operations and advantages of a first embodiment.

FIG. 11 and FIG. 12 are graphs demonstrating the operations and advantages of this first embodiment. FIG. 11 shows the results from recording (simulation) the values of the shaft position (turning displacement X) relative to the steering angle θ when the coefficients μ and ν were set to 2 and 0 respectively. Also, FIG. 12 shows the results from recording (simulation) the values of the shaft position (turning displacement X) relative to the steering angle θ when the coefficients μ and ν were set to 2 and 1 respectively.

These simulation results also demonstrate the advantages of the present invention described above.

Second Embodiment

Figure 13:
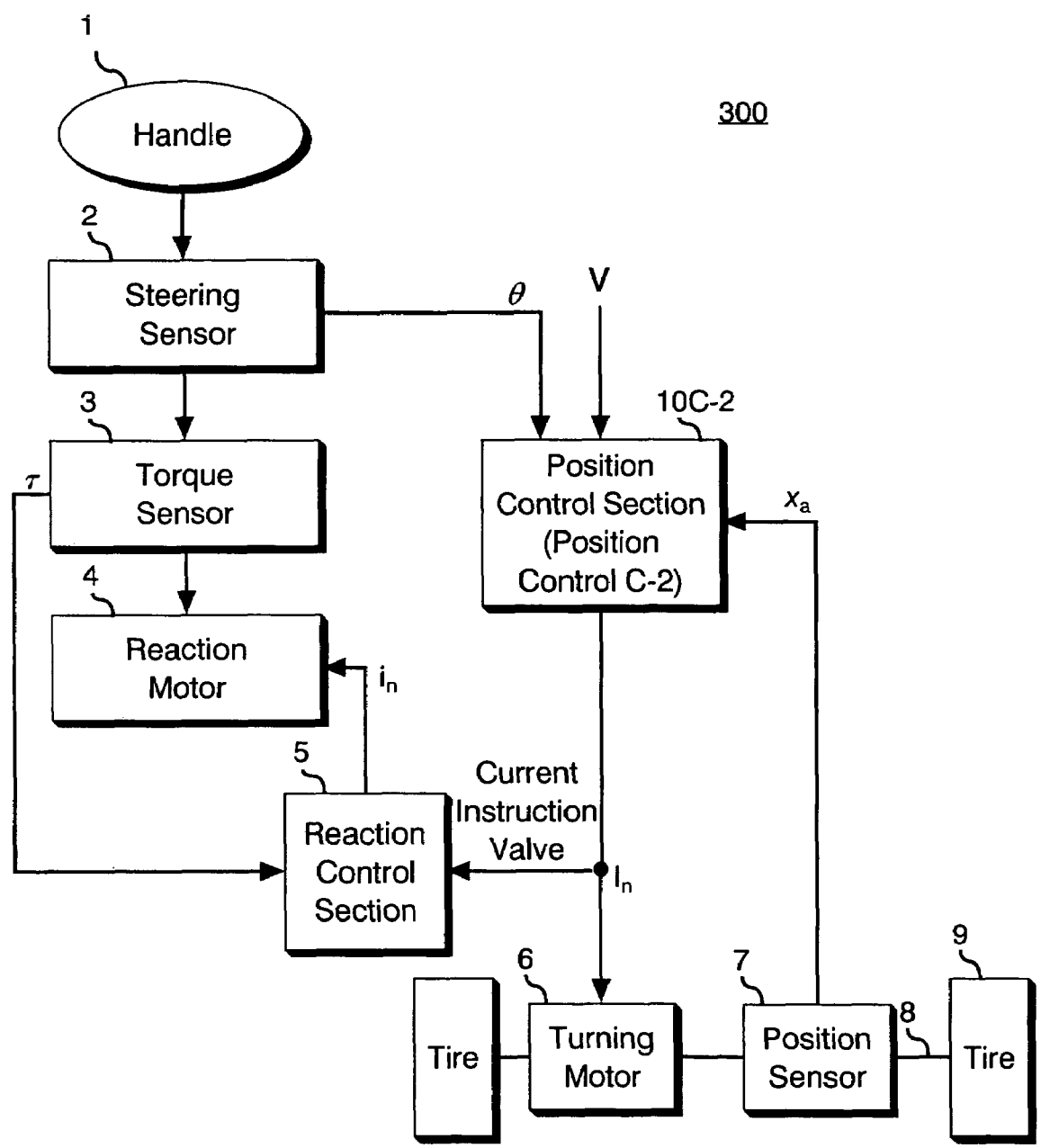
FIG. 13 is a control block diagram illustrating the overall and basic control system of a steering control device according to a second embodiment of the present invention.

FIG. 13 is a control block diagram illustrating the overall and basic control system used in a steering control device 300 according to a second embodiment of the present invention.

The structure of this steering control device 300 is roughly similar to that of the steering control device 200 of the first embodiment described above, except a major characteristic is that the automotive velocity v from a speed meter, not shown in the figures, is sent to a position control section 10C-2. As in the abbreviated expression used in the first embodiment, the position control operations for the turning shaft 8 performed by the position control section 10C-2 may be referred to below as "position control C-2".

Figure 14:
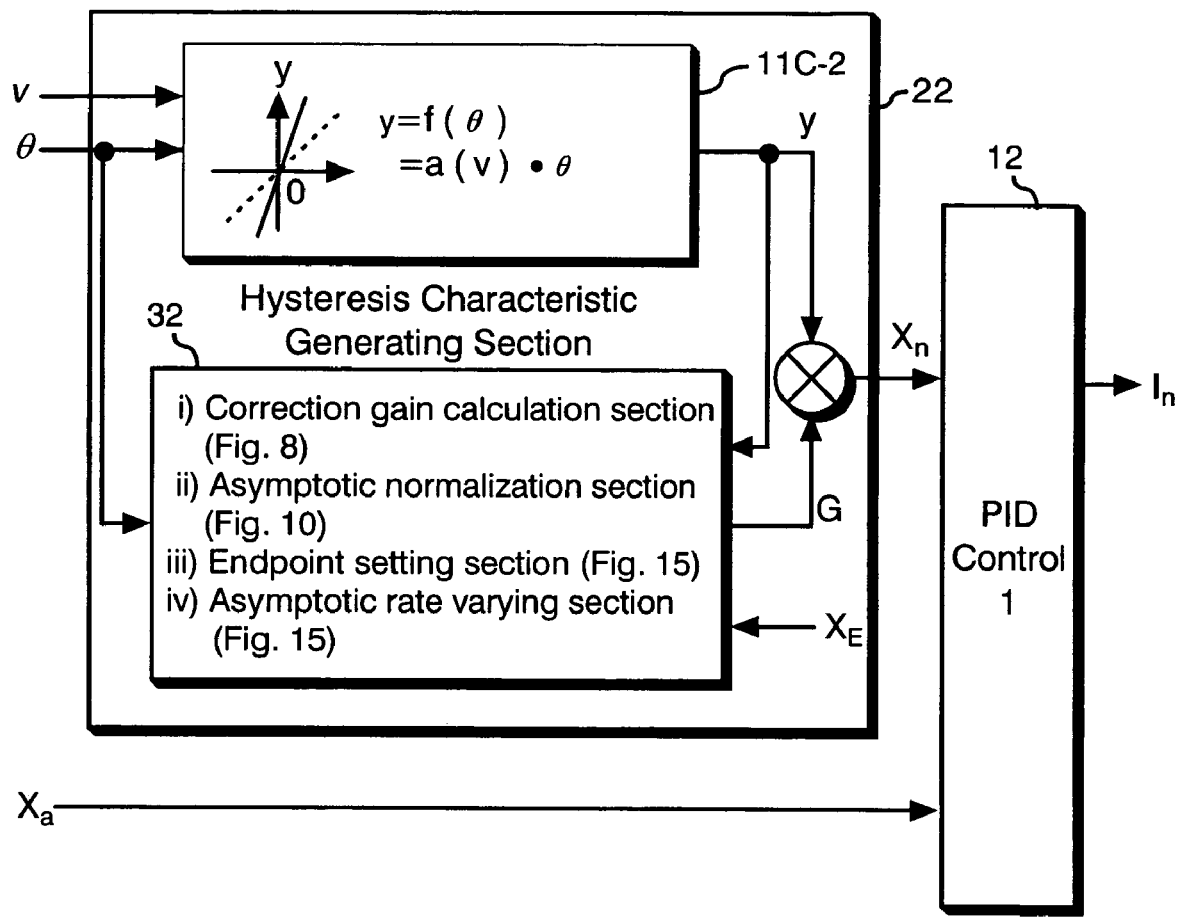
FIG. 14 is a control block diagram illustrating the control system used by the position control section 10C-2 performing turning motor control using hysteresis control.

FIG. 14 is a control block diagram illustrating the control system (position control C-2) used by the position control section 10C-2, which controls the turning motor through hysteresis control. This position control C-2 performs roughly similar control operations as the first embodiment (FIG. 8 and the like) described above, but the following differences are present.

Difference 1: The variable y determined by the control block 11C-2 is a linear equation of the steering angle θ, and the coefficient a is dependent on the automobile velocity v. More specifically, the function y=f(θ, v) is a monotonically increasing function that is symmetrical around the origin and meets the conditions in Equation 8 below.

$$F(0, \forall v)=0,$$

$$\partial y/\partial \theta = a(v),$$

$$\partial a/\partial v \leq 0 \quad (8)$$

Difference 2: The hysteresis characteristic generating section 32 includes the following processing sections.

iii) Endpoint Setting Section

Allows setting a target coordinate γ along the horizontal axis (θ coordinate) of the endpoint $P_O$.

iv) Asymptotic Rate Varying Section Capable of Tracking the Target Coordinate γ

An optimal asymptotic rate A for the target coordinate γ can be calculated.

Figure 15:
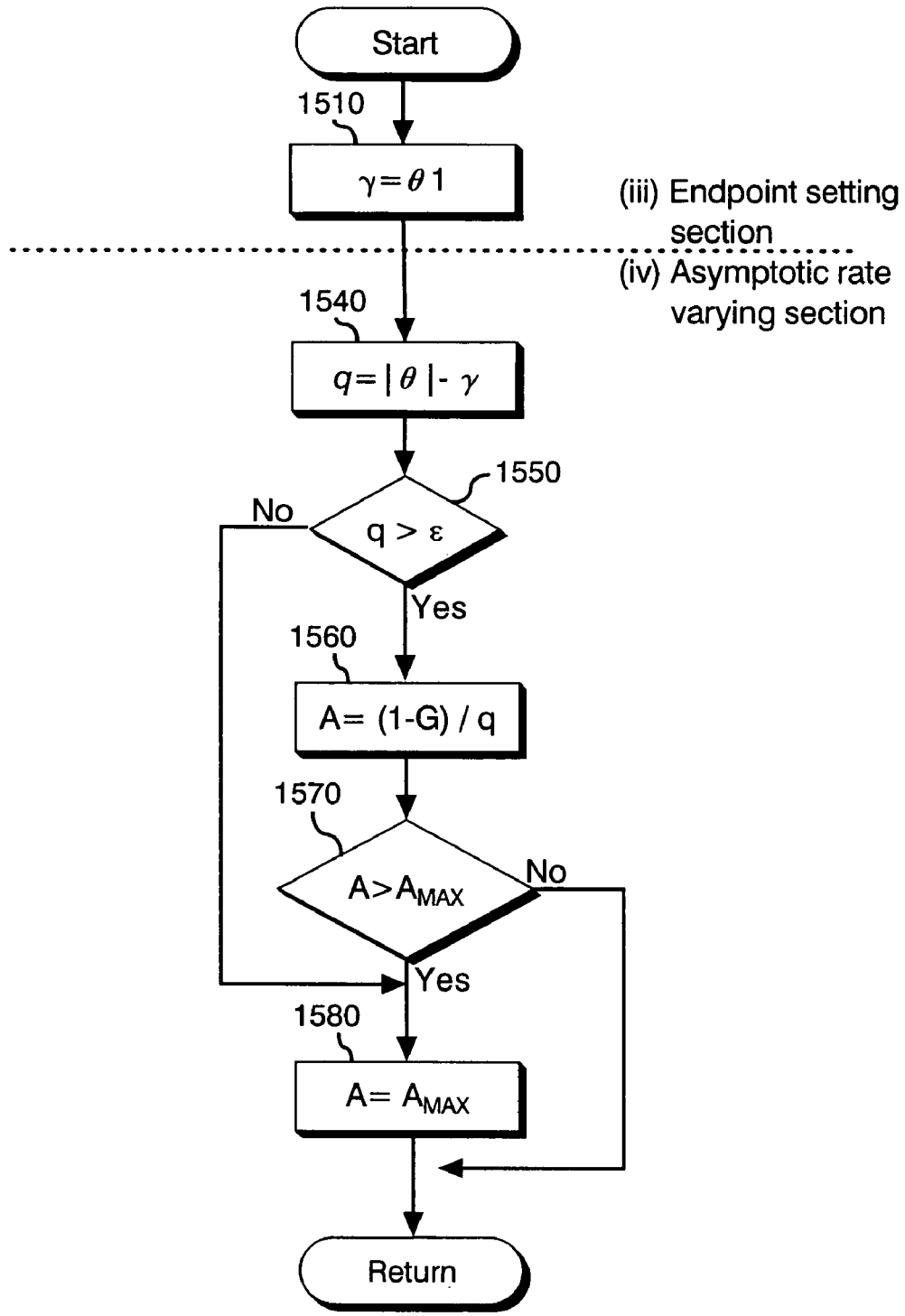
FIG. 15 is a flowchart showing an example of endpoint setting means and asymptotic rate varying means according to a second embodiment.

FIG. 15 is a sample flowchart of an implementation of endpoint setting means and asymptotic rate varying means according to this second embodiment. These operations (the "dynamically update A" subroutine) correspond to a step 1040 to be executed in place of and roughly the same manner as the step 1040 in the "update G" subroutine from FIG. 10 of the first embodiment.

In this "dynamically update A" subroutine in FIG. 15, the target coordinate γ described above is first set at step 1510 (endpoint setting means). The value of θ1 used here can be a suitable constant or can be a dynamically optimized variable, but in this second embodiment θ1 will be a constant.

The operations involved in dynamic optimization of the target coordinate γ will be presented in more detail in the description of the third embodiment.

Next, at step 1540, the variable q is assigned (|θ|—γ). θ is, of course, the current steering angle.

At step 1550, the updated value of the variable q is compared to a predetermined constant ∈ (>0). This evaluation is performed to avoid situations in which the calculated value of A at the following step 1560 could be illegal or indeterminate (arithmetic exception).

Next, at step 1560, the asymptotic rate A is calculated according to the following equation (9).

$$A=(1-G)/q \quad (9)$$

If the value of the asymptotic rate A determined at step 1560 exceeds a predetermined upper limit $A_{MAX}$ or if the evaluation at step 1550 does not find that q>∈, the asymptotic rate A is assigned the value of the upper limit $A_{MAX}$ at step 1580.

With the dynamic optimization of the asymptotic rate A as described in the example above, the correction gain G is updated to a value suitably closer to 1 at each control interval at step 1070 (asymptotic normalizing means). Thus, with the operation described above, the control point (θ, $X_n$) on the hysteresis loop will smoothly approach the desired endpoint $P_O$ before the hysteresis loop is closed.

Third Embodiment

Figure 16:
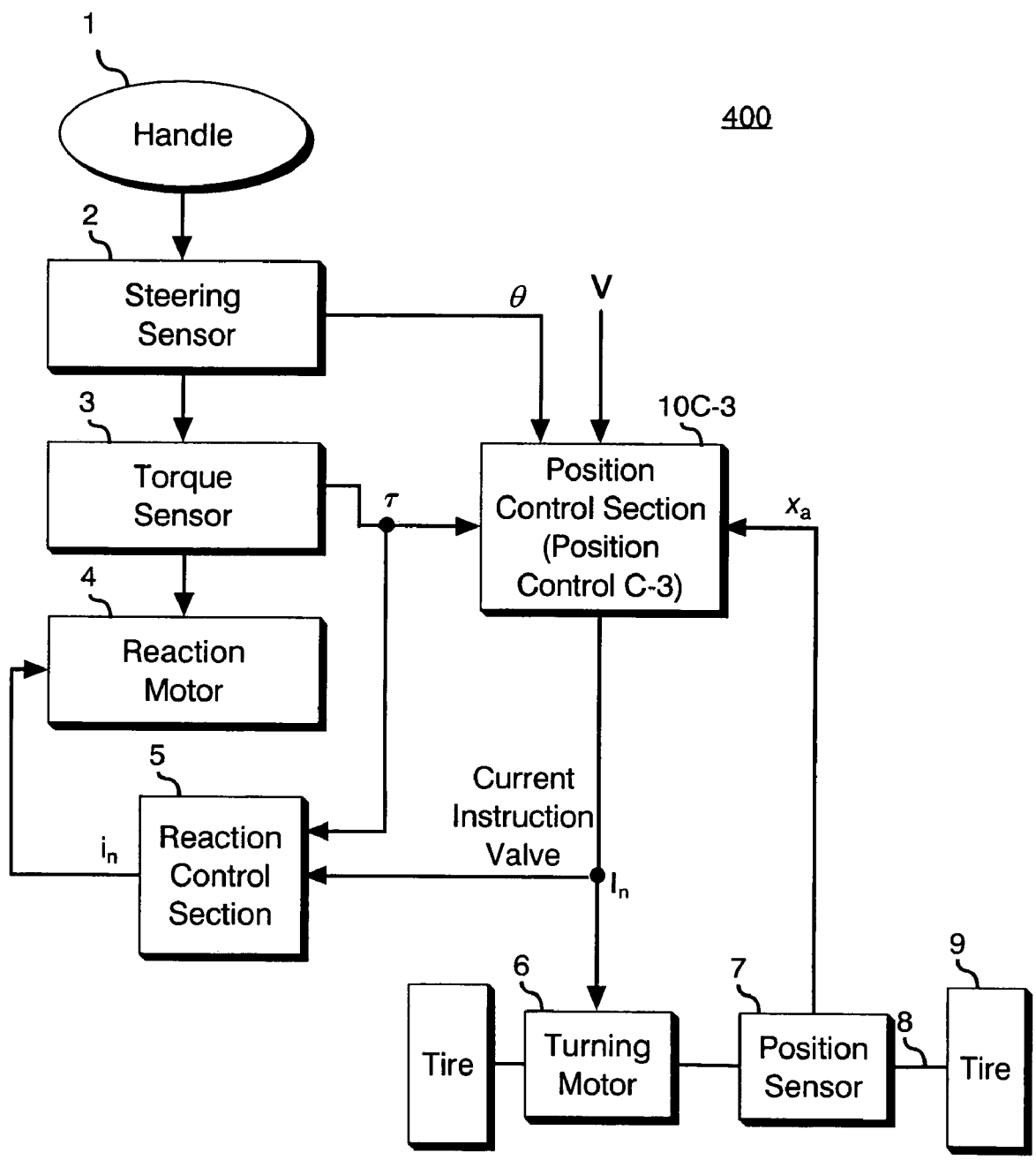
FIG. 16 is a control block diagram showing an overall and basic control system of a steering control device according to a third embodiment of the present invention.

FIG. 16 is a control block diagram illustrating the overall and basic control system used in a steering control device 400 according to a third embodiment of the present invention.

This steering control device 400 has a hardware structure that is roughly similar to that of the steering control device 300 of the second embodiment described above. A major characteristic, however, is that the torque sensor 3 sends a steering torque τ applied by the driver to the steering wheel to the position control section 10C-3. The position control for the turning shaft 8 provided through the position control section 10C-3 may be described as "position control C-3" in a manner similar to that of the second embodiment.

Figure 17:
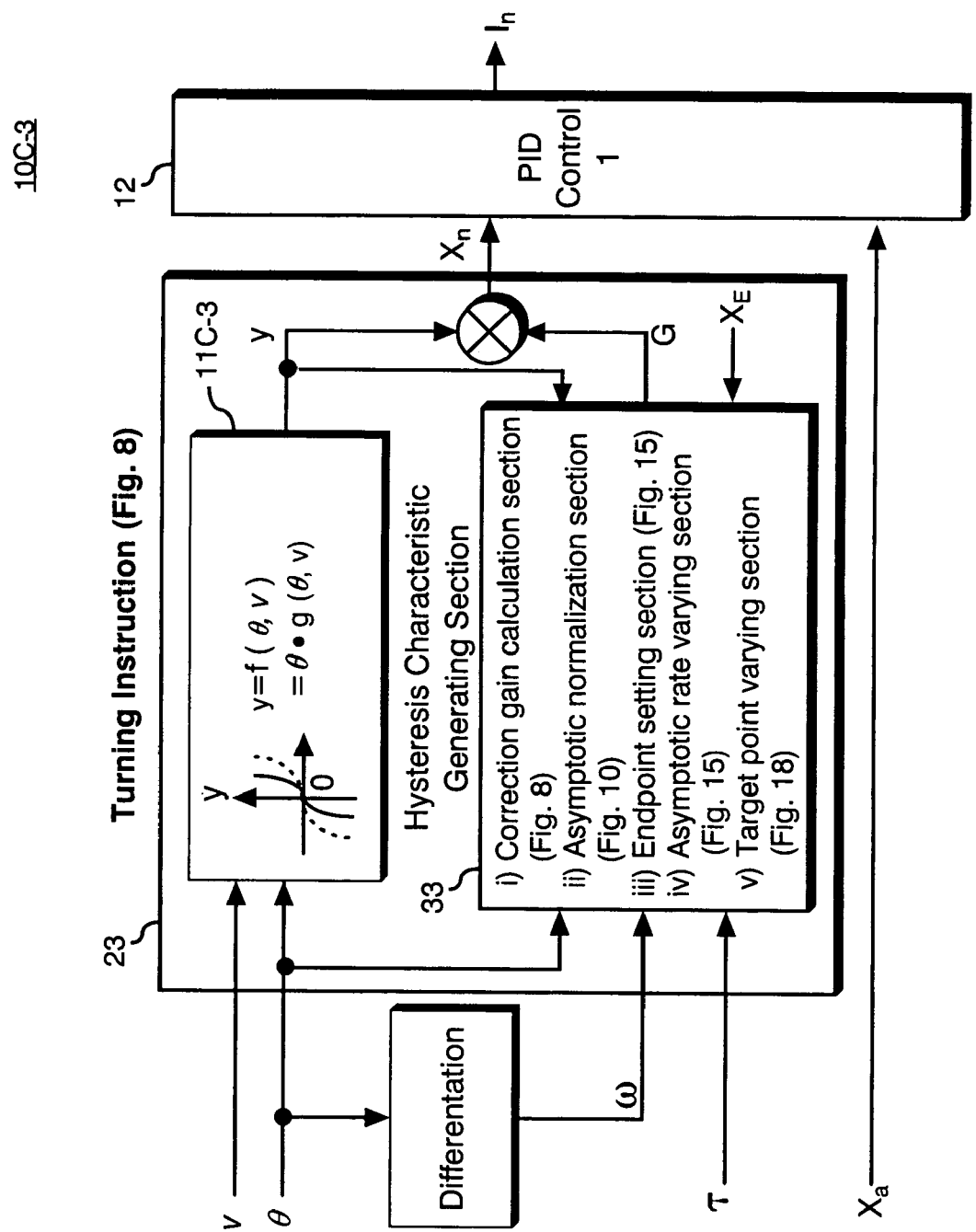
FIG. 17 is a control block diagram showing a control system of a position control section 10C-3 performing turning motor control using hysteresis control.

FIG. 17 is a control block diagram showing the control system of the position control section 10C-3 (position control C-3) that controls the turning motor through hysteresis control.

Difference 1: The variable y determined by the control block 11C-3 is a quadratic equation of the steering angle θ that passes through the origin. The gear ratio (∂y/∂θ) is dependent on the steering angle θ and the automobile velocity v. More specifically, the function y=f(θ, v) is a monotonically increasing function that is symmetrical around the origin and that meets the following equation (10).

$$y = f(\theta, v) = \theta \circ g(\theta, v), \quad (10)$$

$$\therefore f(O, \forall v) = 0$$

Difference 2: The hysteresis characteristic generating section 33 includes the following processing sections.

v) Target Point Varying Section

Dynamically optimizes the target coordinate along the horizontal axis of the endpoint P0, which closes the hysteresis loop.

Figure 18:
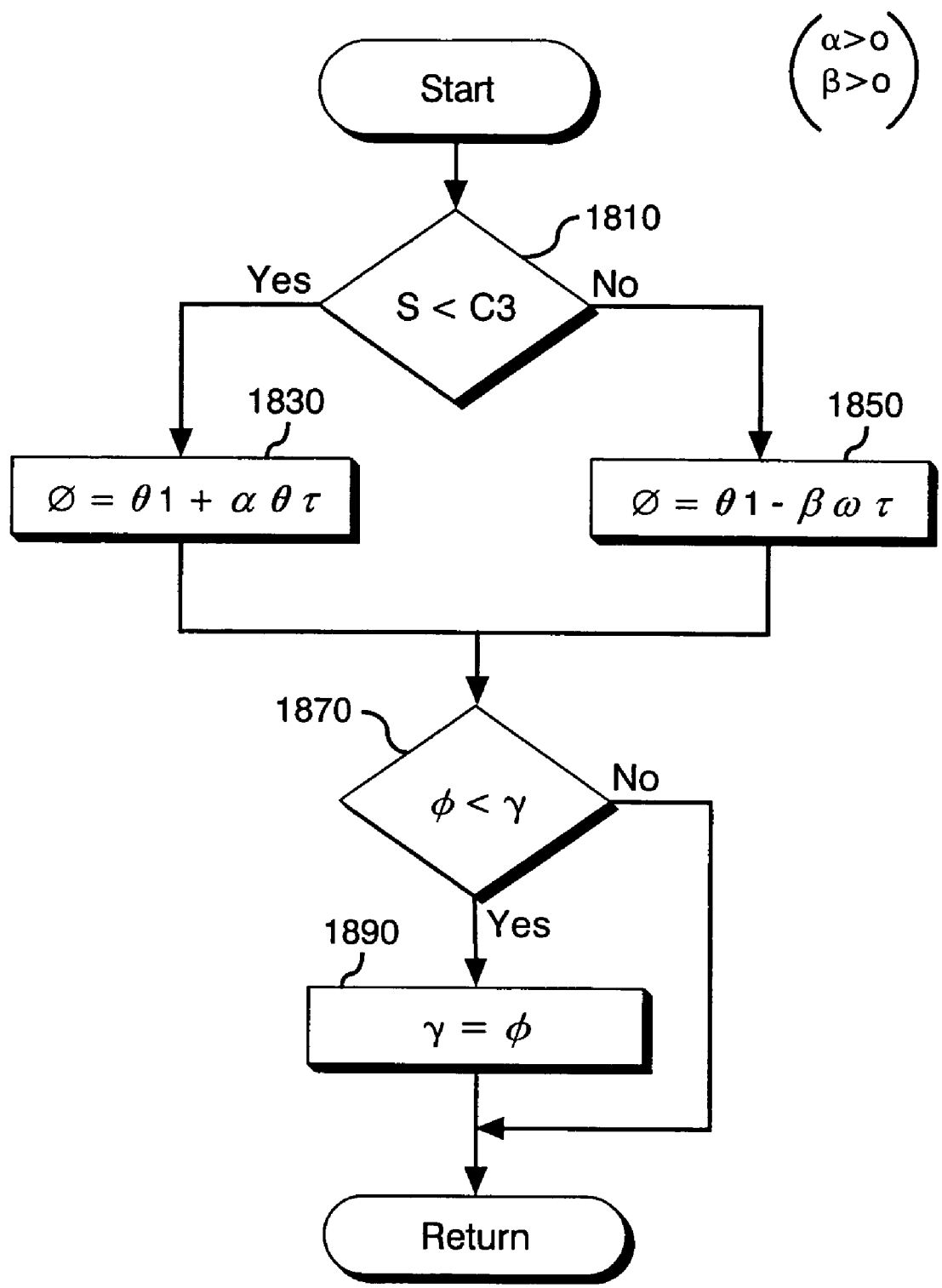
FIG. 18 is a flowchart showing an example of target point varying means according to a third embodiment.

FIG. 18 shows an example of an implementation (control procedure) of target varying means according to this third embodiment. These operations (the "optimize target coordinates" subroutine) are executed in place of step 1510 of a "dynamically change A" subroutine shown in FIG. 15, which is executed in this third embodiment in a manner roughly similar to that of the second embodiment. However, in this case, step 1510 of FIG. 15 is executed at the position of step 830 in FIG. 8 rather than being executed at the start of the "dynamically change A" subroutine.

In the "optimize target coordinates" subroutine in FIG. 18, the steering amount S, which is updated by step 1030 (FIG. 10) and the like described above, is determined at step 1810. If this value is smaller than a predetermined constant C3 (>0), it is likely that a transition from turning to restoring has not taken place, and the absolute value of the steering velocity ω is set to a value close to 0. In this case, (if S<C3), the equation (11) below is used at step 1830 to set up variable φ. Otherwise, the equation (12) below is used at step 1850.

Angle θ1 is the same constant mentioned earlier that was set up as the initial value for the target coordinate γ at step 830. Also, constants α, β are positive constants that have been tuned to provide appropriate results. Also, the steering torque τ and the steering velocity ω are positive for leftward rotations, as in the case with the steering angle θ.

$$\phi = \theta 1 + \alpha \circ \theta \circ \tau \quad (11)$$

$$\phi = \theta 1 - \beta \circ \theta \circ \tau \quad (12)$$

Based on these settings, the status variables ($\theta$, $\tau$, $\omega$, and the like) on the hysteresis loop are used to calculate a value for the variable $\phi$, which can become a candidate value for the target coordinate $\gamma$.

Furthermore, at step 1870, the current target coordinate $\gamma$ is compared with the variable $\phi$. The value of $\gamma$ is updated to the variable $\phi$ at step 1890 only if $\phi<\gamma$. These operations at step 1870 and step 1890 serve to monotonically decrease the value of the target coordinate $\gamma$ as necessary. As can also be seen from the operations at step 1540 through step 1560, the value of $\gamma$ can be negative.

Since the value of the target coordinate $\gamma$ is determined based on the status variables ($\theta$, $\tau$, $\omega$, and the like) as described above, if there is an urgent avoidance maneuver or the like, the $\partial X_n/\partial \theta$ is kept relatively large according to the degree of urgency. Otherwise, during normal operations, a normal state can be restored relatively quickly (G=1: path (a)).

More specifically, for example, shortly after a turning operation changes to a restoring operation, the asymptotic rate A will be set according to the equation (11), resulting in smaller values for larger absolute values of the steering angle $\theta$ and the steering torque $\tau$. As a result, the hysteresis loop path (c) and the like optimized in this manner can adjust to situations, including those where steering involves a high degree of urgency.

Also, when a driver is restoring the steering wheel, the asymptotic rate A based on the equation (12) is smaller when the work done to the steering wheel ($\omega \circ \tau$) is larger. Thus, the hysteresis loop path (c) and the like optimized in this manner can handle situations where the steering involves a high degree of urgency.

Also, there are two reasons for monotonically decreasing the value of $\gamma$.

(1) To prevent instabilities in the control system resulting from vibrations in the target coordinate of the endpoint $P_O$.

(2) So that, when the degree of urgency is judged to be highest, the target coordinate $\gamma$ or the asymptotic rate A is set in order to maintain a relatively large gear ratio ($\partial X_n/\partial \theta$), thus giving priority to responsiveness in situations such as urgent avoidance maneuvers.

If the function f($\theta$) providing the turning displacement reference value y, the upper limit $X_E$ of the turning displacement X, the upper limit $\theta_E$ of the turning angle $\theta$, or the like are dependent on the automobile velocity v or the like, it would be preferable to have the constants $\theta 1$, $\alpha$, $\beta$, and the like referenced at step 1830 and step 1850 changed (made dependent to) the automobile velocity v or the like as appropriate. By making these types of settings, the target coordinate of the endpoint $P_O$ can be optimized to match the function f($\theta$) providing the turning displacement reference value y, the upper limit $X_E$ of the turning displacement X, the upper limit $\theta_E$ of the steering angle $\theta$, and the like.

The third embodiment described above discloses means for dynamically determining the target value $\gamma$ for the horizontal axis coordinate of the hysteresis loop endpoint $P_O$. Similarly, it would also be possible to dynamically determine the target value for the vertical axis coordinate of the hysteresis loop endpoint $P_O$.

It would also be possible, for example, to provide a steering control device equipped with means for generating hysteresis characteristics roughly similar to that of the second embodiment or the third embodiment that is based on an asymptotic rate B ($\equiv dG/dZ$) using, instead of the steering amount S, a turning amount Z that can be defined in a similar manner.

Fourth Embodiment

In the embodiments described above, the upper limit $X_E$ of the turning displacement can be a constant but does not necessarily have to be a constant. The same goes for the upper limit $\theta_E$ of the steering angle.

Figure 3:
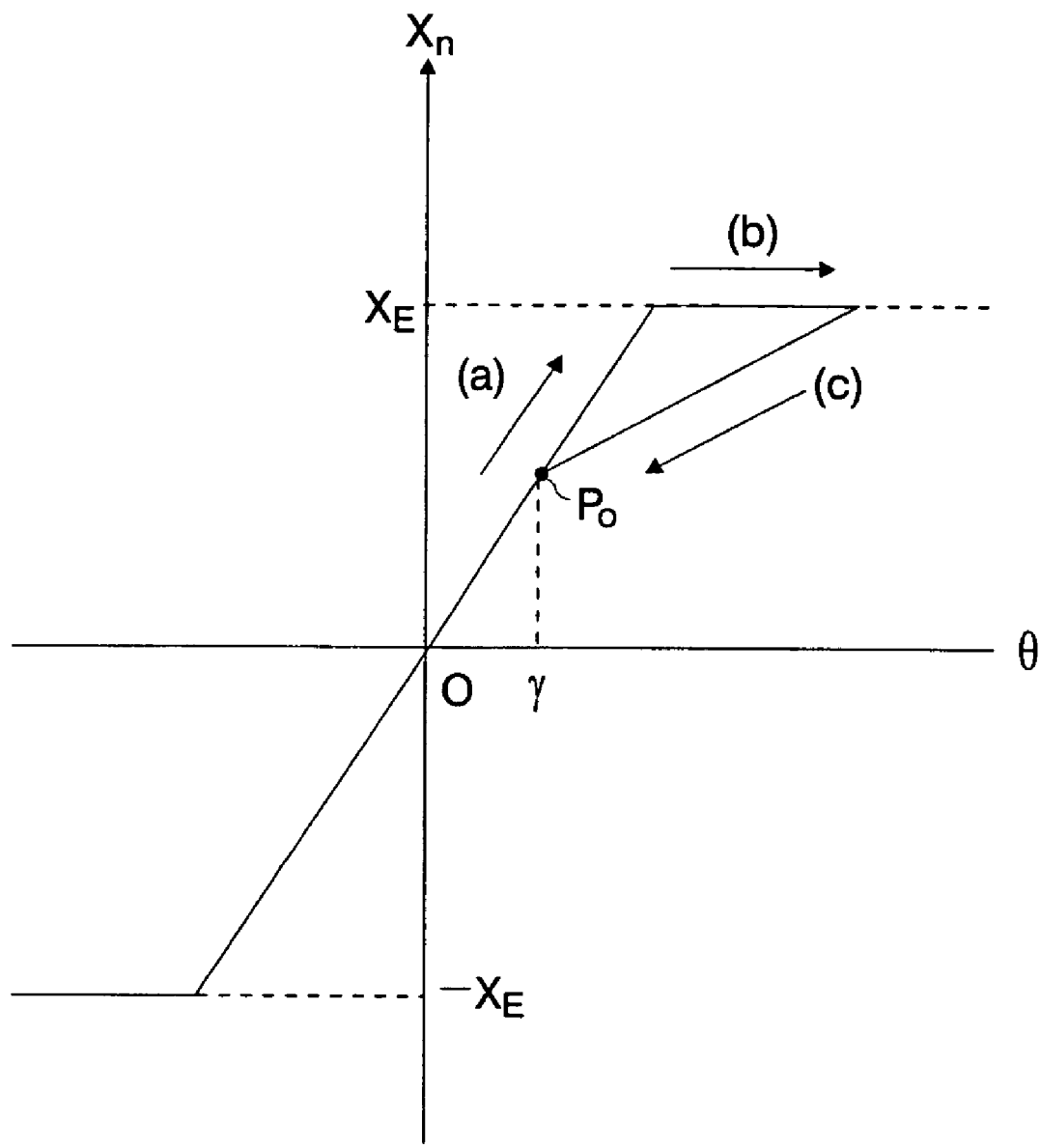
FIG. 3 is a graph for the purpose of describing the operations of the present invention.
Figure 19:
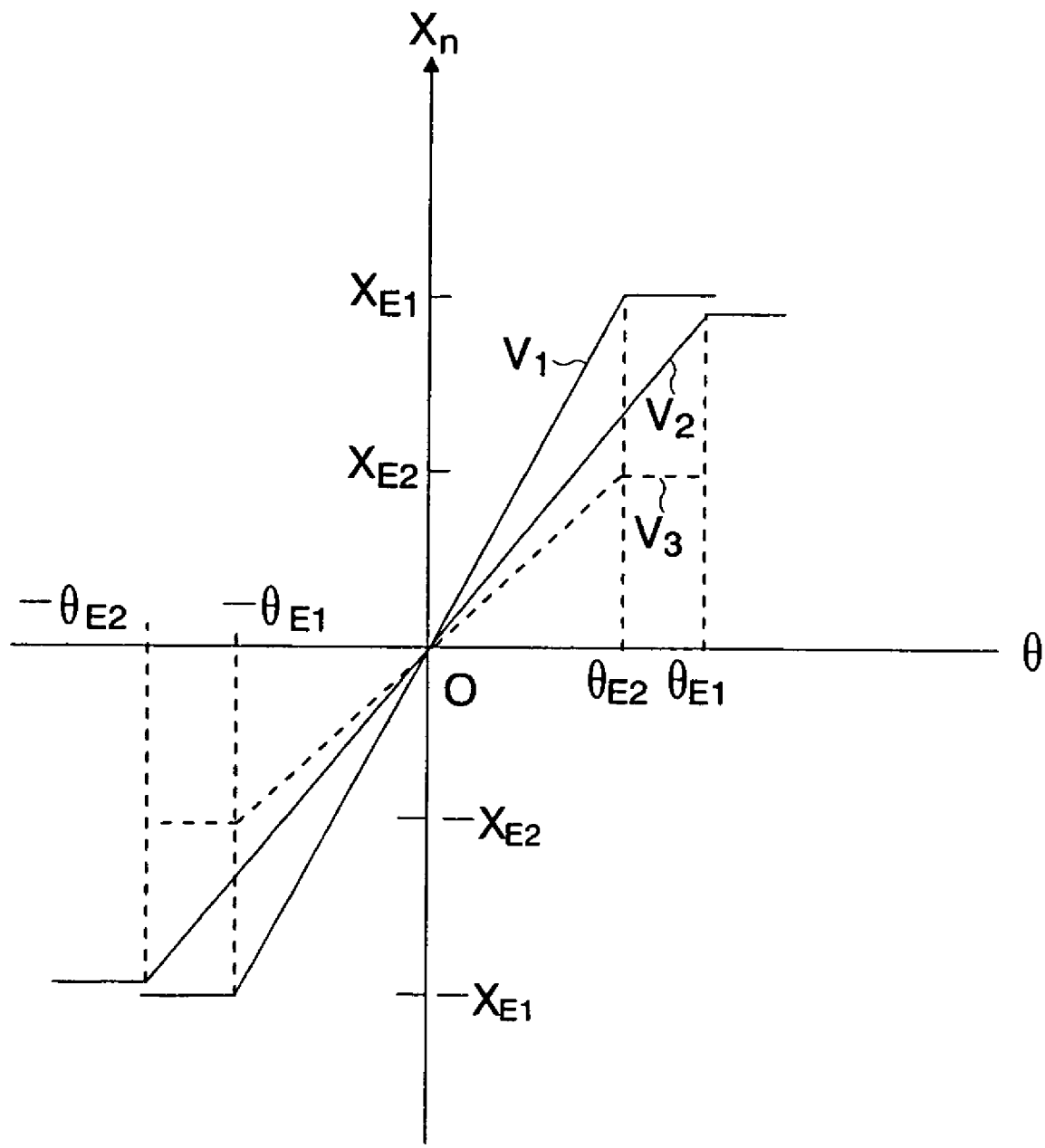
FIG. 19 is a graph showing an example of a turning displacement calculator according to a fourth embodiment of the present invention.

FIG. 19 is a graph showing an example of operations performed for the instruction value $X_n$ for the turning displacement amount in the fourth embodiment ($v_1<v_2<v_3$). In this graph, only the paths corresponding to path (a) and path (b) from FIG. 3 are shown. For example, the upper limit $\theta_E$ of the steering angle, the gear ratio ($\partial X_n/\partial \theta$), and the like can made variable according to the automobile velocity v in this manner. With the settings indicated in FIG. 19, for example, the gear ratio ($\partial X_n/\partial \theta$) decreases when the automobile velocity v increases, resulting in a relatively stable steering "feel" even at high speeds and the like.

Figure 20:
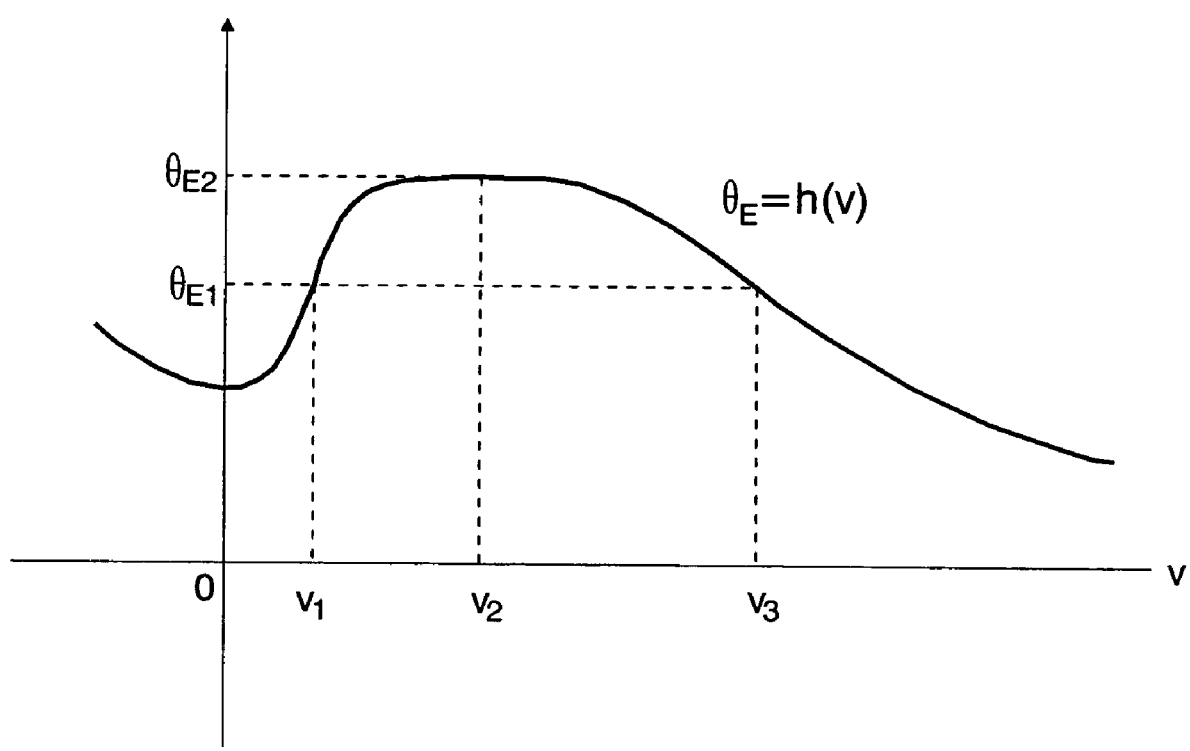
FIG. 20 is a graph showing an example of a threshold value setting system of steering angle threshold value varying means according to a fourth embodiment of the present invention.

The graph in FIG. 20 shows an example of a system for setting threshold values performed by means for varying steering angle threshold values according to the fourth embodiment. Here, h is a function determining the upper limit $\theta_E$ of the steering angle $\theta$ based on the step automobile velocity v. This type of function (steering angle threshold varying means) can, for example, be implemented through a map (table data), interpolation operations, or the like expressing the contents of FIG. 20.

$$\theta_E = h(v) \qquad (13)$$

Then, when the upper limit $\theta_E$ is provided, the upper limit $X_E$ for the turning displacement instruction value can be obtained using the following equation 14. The function f below is the same as the function f provided as an example in the second embodiment, the third embodiment, and the like.

$$X_E = f(\theta_E, v) \qquad (14)$$

Figure 21:
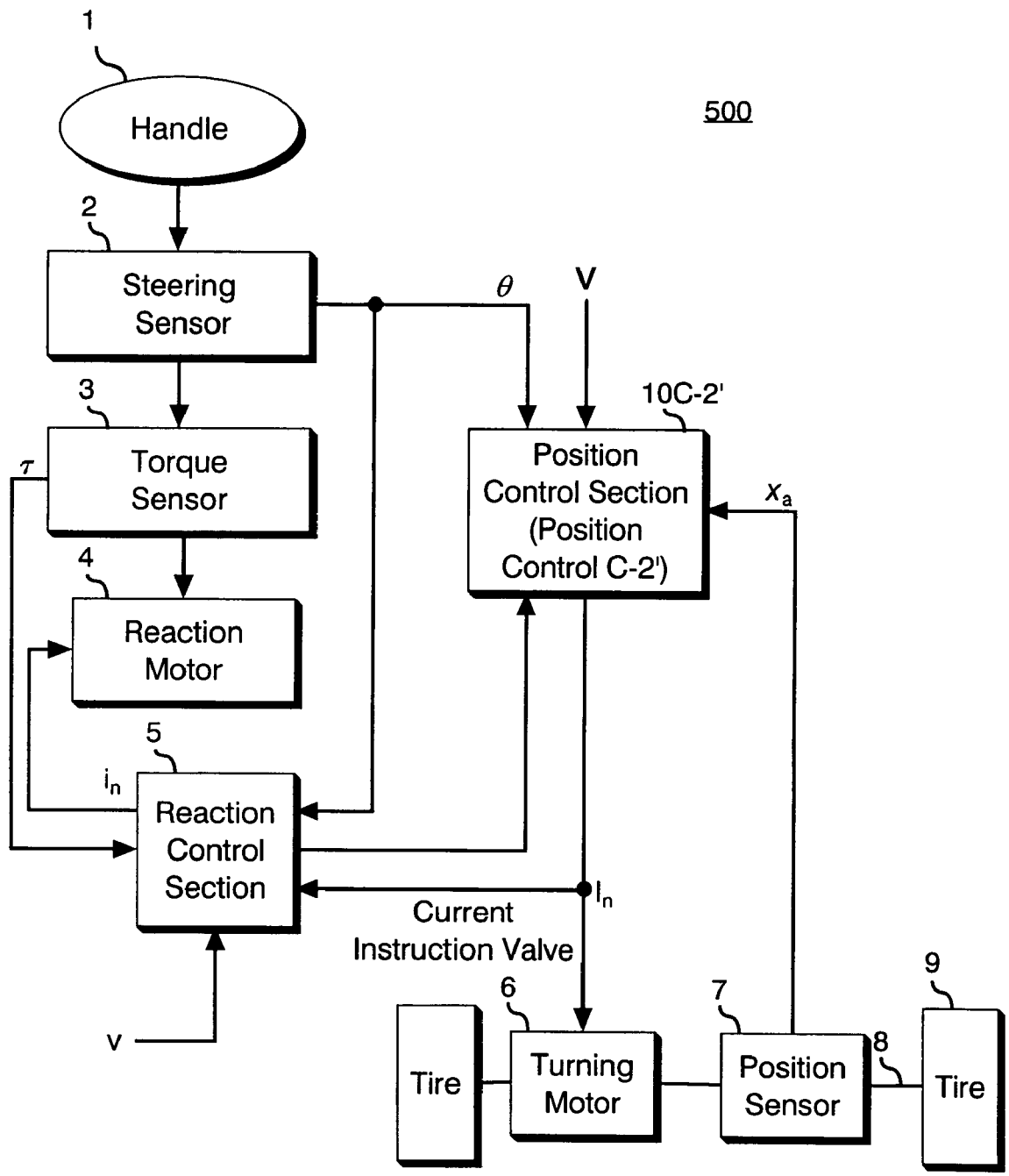
FIG. 21 is a control block diagram showing an overall and basic control system for a steering control device according to a fourth embodiment of the present invention.

FIG. 21 is a control block diagram showing the basic and overall control system for a steering control device 500 in the fourth embodiment.

The steering control device 500 has roughly the same hardware structure as the steering control device 300 from the second embodiment described above, but a major characteristic is the further inclusion of an operation wherein a position control section 10C-2' sends the reaction control section 5 the upper limit $\theta_E$ of the steering angle $\theta$ using the equation (13) above.

As in the expression used in the second embodiment, the position control operations for the turning shaft 8 performed by the position control section 10C-2' may be referred to below as "position control C-2'".

Also, the reaction control section 5 in this embodiment differs from that of the steering control device 300 from the second embodiment in the following ways:

Difference 1: The automobile velocity v is also sent to the reaction control section 5.

Difference 2: The steering angle $\theta$ is sent to the reaction control section 5.

Difference 3: The upper limit $\theta_E$ of the steering angle is sent from the reaction control section 5 to the position control section 10C-2'.

In the position control C-2', the upper limit $\theta_E$ of the steering angle is sent from the reaction control section 5 and used in order to determine, based on the equation (14) above, an optimal instruction value upper limit $X_E$ for the turning displacement suited for the automobile velocity v. Other aspects (control procedures and the like) can be the same as the position control C-2 shown as an example in the second embodiment. Also, the calculations for the equation (14) can be performed, for example, immediately before or after step 810 in FIG. 8. Since this calculation is performed within step 630, it is performed based on the value of $\theta_E$ from the previous control interval, but this timing difference (one control interval) is not a problem since the length of one control interval is short enough.

The reasons the steering angle $\theta$ and the upper limit $\theta_E$ thereof are used in the reaction control section 5 will be described.

Figure 22:
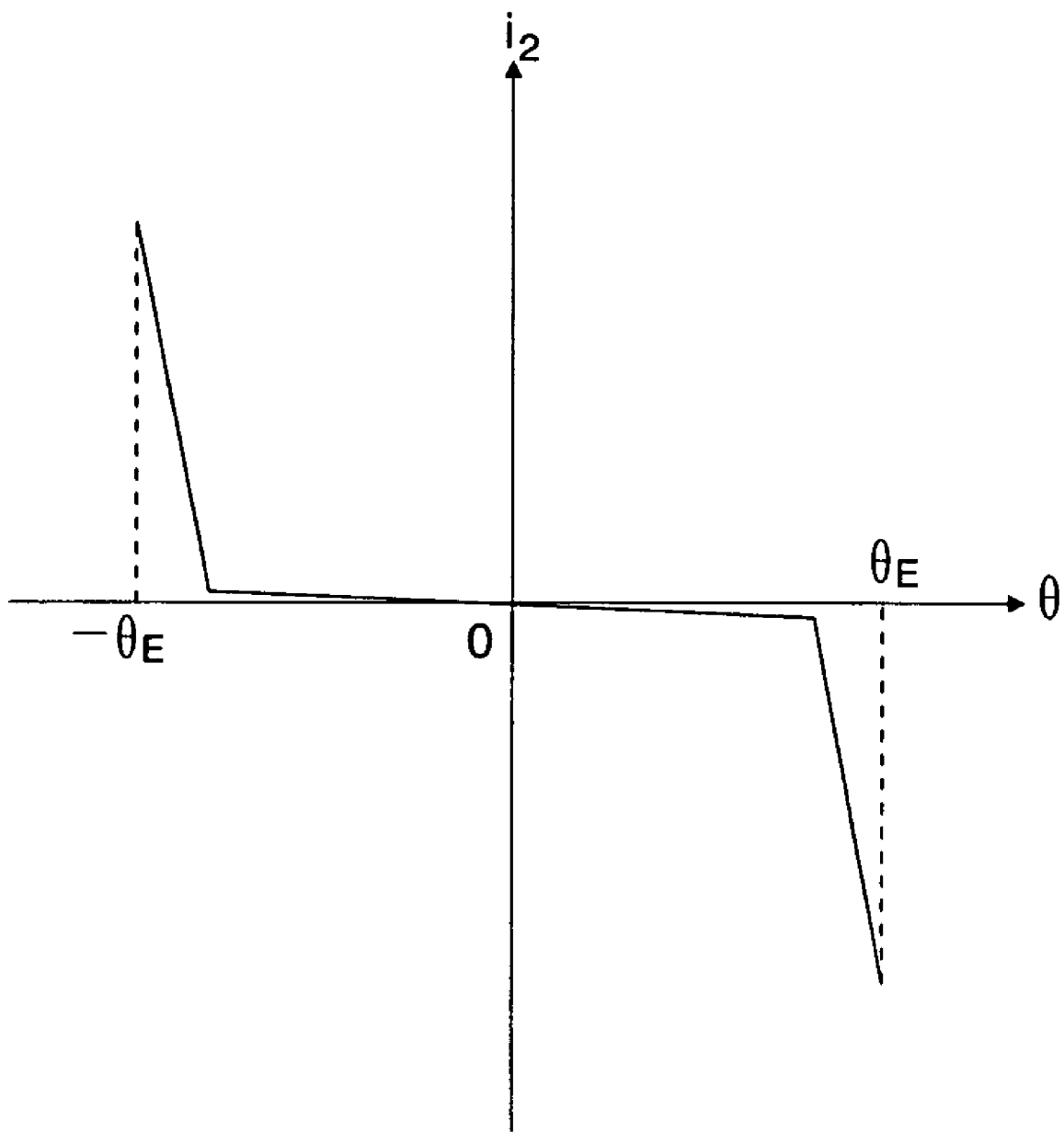
FIG. 22 is a graph showing an example of endpoint reaction generating means according to a fourth embodiment.

FIG. 22 is a graph showing an example of an implementation of means for generating end reaction according to the fourth embodiment. The value of an end reaction generating current $i_2$ increases rapidly near predetermined threshold values $(+/-\theta_E)$. For example, if this type of current instruction (end reaction generating current $i_2$) is included for the second term of the equation "current instruction value $i_n = i_1 \ldots$ (4)", it acts as resistance to the steering operation so that an abutment point (endpoint) can be simulated or emulated for any value of steering angle $\theta$ regardless of whether the turning position is near an end or not.

This is why the steering angle $\theta$ and the upper limit $\theta_E$ are used in the reaction control section 5 as well.

Figure 23:
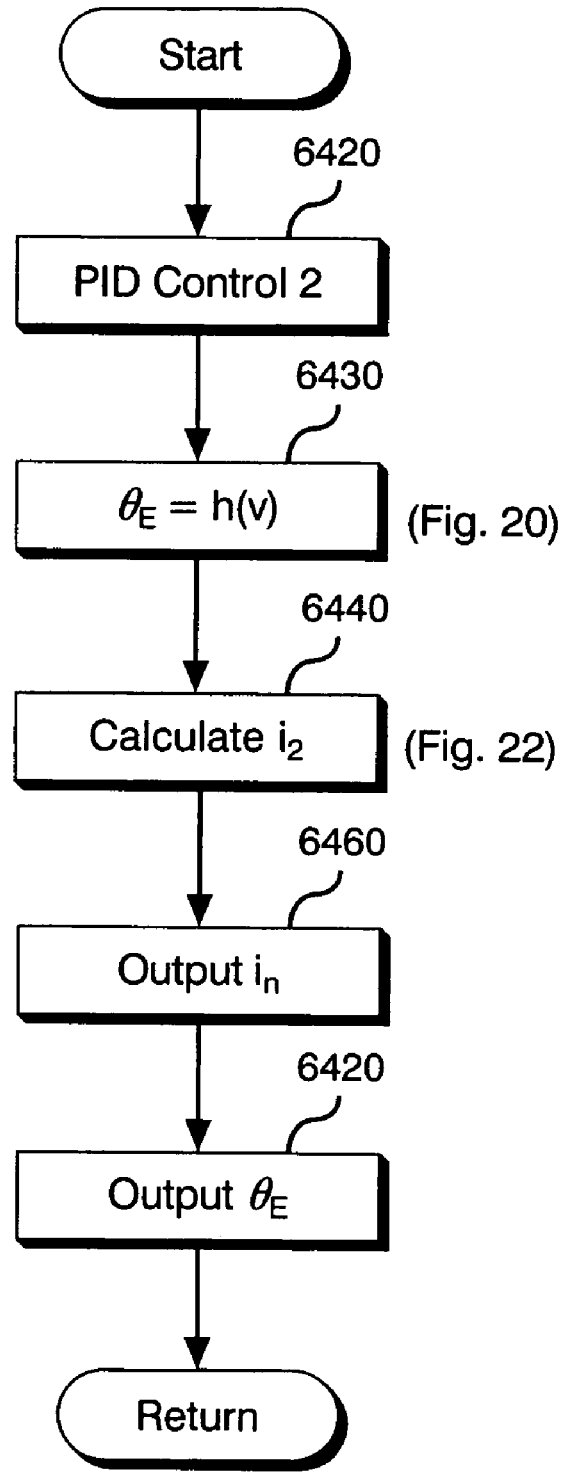
FIG. 23 is a flowchart showing a control procedure for reaction motor control in a steering control device according to a fourth embodiment.
Figure 24:
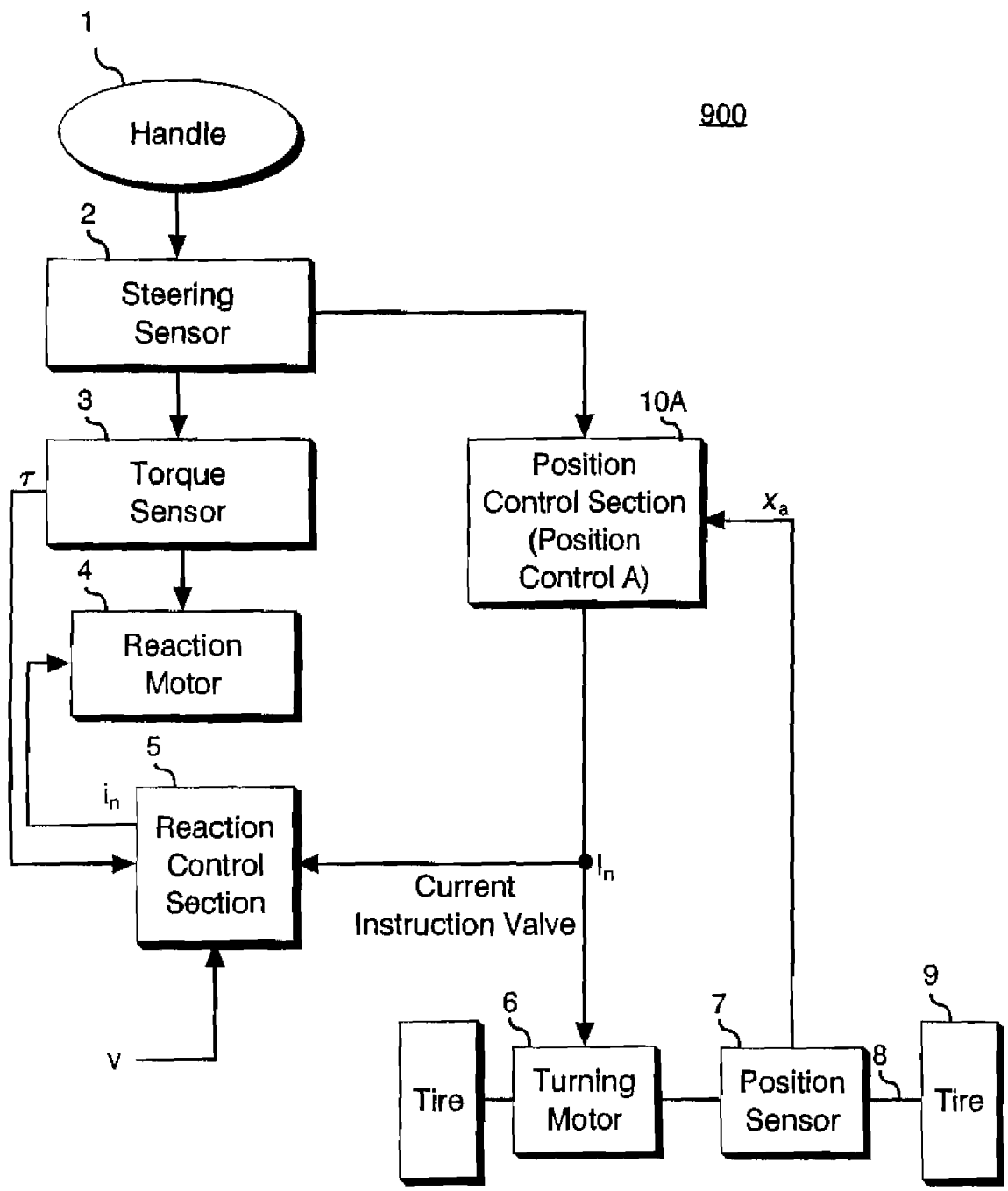
FIG. 24 is a control block diagram showing a control system for a conventional steering control device.

At step 650 of FIG. 5 described above, the fourth embodiment calls and executes the subroutine in FIG. 23, which is an implementation of "reaction motor control".

More specifically, FIG. 23 is a flowchart showing an example of control operations for the reaction motor control used in the steering control device 500 of the fourth embodiment.

In the "reaction motor control" subroutine in FIG. 23, step 6420 first uses the equation (4) described above to calculate, using "PID control 2" described above, the first term $i1$ of the instruction current $i_n$, which will be the final output.

Next, at step 6430, the upper limit $\theta_E$ of the tolerance range for the steering angle $\theta$ is calculated using, for example, the automobile velocity v and a suitable function h implemented using a map (table data) as shown in FIG. 20. This upper limit $\theta_E(>0)$ can be set (optimized) to any value within a range where heat generation from the turning motor described above does not become a significant or apparent problem.

Next, at step 6440, the end reaction generating current $i_2$ is calculated (endpoint reaction generating means), e.g., using a map (table data), an example of which is shown in FIG. 22, described above. FIG. 22 shows an example involving linear settings, but the sudden increase/decrease can be formed as a curve. For example, a curve can be defined with a quadratic, cubic, or quartic equation or the like. Alternatively, an appropriate abutment "feel" can be implemented using a suitable map (table data) and interpolation operations.

Then, at step 6450 in FIG. 23, the current instruction value in for the reaction motor 4 is determined.

$$I_n = i_1 + i_2 \qquad (15)$$

Then, at step 6460, the current instruction value in calculated as described above is sent to a reaction motor drive circuit, not shown in the figures. This reaction motor drive circuit can be equipped within the reaction control section 5 or can be set up with the reaction motor 4.

Finally, at step 6470, the upper limit $\theta_E$ of the steering angle is sent from the reaction control section 5 to the position control section 10C-2'.

When the "reaction motor control" operations described above have been completed, control is restored to the calling source (FIG. 5) of this subroutine.

By following the steering control procedure described above, a virtual abutment resistance (steering reaction) can be generated for a steering angle $\theta$ for which there are no physical restrictions (endpoints or abutment points) in the steering wheel rotation range. This can be done without leading to motor heat generation or the like.

When generating this type of abutment resistance (steering reaction), steering that exceeds the threshold values $(+/-\theta_E)$ of the rotation range of the steering wheel becomes difficult. This is very convenient in terms of safety and operability. Also, this type of action by endpoint reaction generating means almost completely prevents cases where the value of correction gain G becomes a value other than 1, i.e., cases where the point being controlled $(\theta, X_n)$ diverges from the path (a). In cases such as when the driver applies a steering torque $\tau$ that exceeds the upper limit of the output torque of the reaction motor 4, the actions of the hysteresis characteristic generating section (31/32/33) are very effective.

More specifically, even if a steering control device includes endpoint reaction generating means as described above, hysteresis characteristic generating means of the present invention serves as a very effective fail-safe mechanism.

In the examples of the embodiments described above, the present invention is implemented for steer-by-wire systems. However, the range of implementation of the present invention is not specifically restricted to steer-by-wire systems. For example, the problems described above, e.g., as shown in FIG. 2, associated with "play" regions can also occur where turning control such as shown in FIG. 19 is implemented for steering control devices and the like where, for example, position instruction (position control) can be provided directly to the actual steering angle of the steering wheel, the displacement of the turning axis, or the like, or, more generally, the steering mechanism and the turning mechanism are mechanically connected.

More specifically, in steering control devices such as "VGRS" (variable gear ratio system) devices, where the gear ratio $(\partial X_n / \partial \theta)$ varies according to the automobile velocity or the like, a "play" region similar to when a heat build-up prevention system such as the one shown in FIG. 2 is used is generated in the steering range of $\theta_{E1} < |\theta|$ when automobile velocity $v = v_1, v_3$, and the like in FIG. 19.

However, even in these more widely used steering control devices, implementing the present invention will adequately provide the advantages of the present invention, as can be clearly seen from the operations and the like of the present invention.

Also, in the embodiments described above, the embodiments of the present invention are applied only to cases where the turning displacement instruction value $X_n$ is set (or corrected) and output so that the origin is arranged on or outside the hysteresis loop on the $\theta - X_n$ plane. However, in implementing the present invention, the origin of the $\theta - X_n$ plane does not necessarily have to be on or outside the hysteresis loop. For example, the present invention can be implemented even if the turning displacement instruction value $X_n$ is output so that the origin is inside the hysteresis loop or the like on the $\theta - X_n$ plane, thus adequately providing the advantages of the present invention. This is clear from the operations of the present invention and the like. Of course, it would also be possible to take into account cases such as when the hysteresis loop is translated by a small amount on the $\theta - X_n$ plane.

In cases such as when the steering wheel is turned too much and is then steered quickly in the opposite direction, this steering operation can cause the steering wheel to pass the vicinity of the neutral point at a relatively high speed. Possible times when this can occur include parking, parking the car in a garage, and emergency avoidance involving sudden steering wheel operation. Such cases can be detected, estimated, or predicted by, for example, detecting through the settings at step 1850 and the like in FIG. 18 when the variable φ becomes negative.

By generating hysteresis loops wherein the origin is positioned inside or on the hysteresis loop (path (a) or path (c)) on the $\theta$–$X_n$ plane, the maximum value of the slope of the steering path $(\partial X_n/\partial\theta)$ on the $\theta$–$X_n$ plane can be kept relatively low in cases such as when, right after the driver turned the steering wheel too much, a large and fast turn that goes past the neutral point is needed in the opposite direction. This action has the advantage of restricting output of a position instruction that exceeds the ability of the turning motor to track the instruction value $X_n$, i.e., a position instruction that requests an extremely large $\partial X_n/\partial t$ (or differential $\Delta X$) rate of change over time. As a result, with this type of hysteresis loop generation, it is easy to form position instruction series (instruction series) that can be tracked in a relatively stable and reliable manner, thus providing advantages when cases such as the above take place.

In such cases, the steering angle θ passes the vicinity of the neutral point of the steering wheel at a high speed so that the driver is not conscious of the position of the neutral point of the steering wheel. As a result, the need to keep the neutral point of the steering wheel steering angle aligned with the turning shaft neutral point as much as possible can be momentarily overridden as an exceptional case.

The scope of the present invention takes into account the generation of hysteresis loops where the origin is positioned within a hysteresis loop on the $\theta$–$X_n$ plane. As a result, the present invention can be implemented (applied) to these circumstances (design conditions), resulting in an invention that has a wide range of applications.

In the embodiments described above, the correction gain G is used for hysteresis control. However, it would also be possible to implement a desired hysteresis control based on the present invention by, for example, directly controlling a localized gear ratio $(\partial X_n/\partial\theta)$. The focus of the present invention is to prevent the localized gear ratio $(\partial X_n/\partial\theta)$ from staying continuously at 0 in cases where the steering wheel is turned too much so that the steering angle θ exceeds the tolerance limit $(\theta=+/-\theta_E)$, and then the steering wheel is turned in the opposite direction. Thus, the hysteresis control (hysteresis characteristic generating means) of the present invention that can avoid such situations can, of course, be implemented by directly controlling the localized gear ratio $(\partial X_n/\partial\theta)$.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a steering control device equipped with: a turning mechanism including a turning actuator driving a position-controllable turning shaft; and a steering angle sensor detecting a steering angle θ of a steering wheel, a steering control device comprises:
 a turning displacement sensor detecting a turning displacement X $(-X_E \leq X \leq +X_E)$ in said turning mechanism; and
 means for calculating a turning instruction value calculating an instruction value for a turning displacement in said turning mechanism based on said steering angle θ; wherein:
 said turning instruction value calculating means includes means for generating hysteresis characteristics calculating said instruction value $X_n$ when an absolute value |θ| of said steering angle θ exceeds a predetermined threshold value $\theta_E$ corresponding to an upper limit $X_E$ of said turning displacement X, said instruction value $X_n$ based on:
 a vertical axis coordinate corresponding to said steering angle θ on a predetermined hysteresis loop with one side being a section of a line $X_n=+/-X_E$ on a $\theta$–$X_n$ plane; and
 a steering direction, either steering direction or restoring direction, of said steering wheel.

2. A steering control device as described in claim 1 wherein a steering mechanism including said steering wheel and said turning mechanism are mechanically separated, and an electrical coupling mechanism substitutes for a connecting mechanism connecting said steering mechanism and said turning mechanism.

3. A steering control device as described in claim 2 further comprising means for setting an endpoint setting a target coordinate for an endpoint $P_O$ that closes said hysteresis loop.

4. A steering control device as described in claim 3 wherein said endpoint setting means includes means for varying a target point dynamically varying said target coordinate for said endpoint $P_O$ based on a steering velocity ω $(=d\theta/dt)$, a steering torque τ, said steering angle θ, said steering direction, or an automobile velocity v.

5. A steering control device as described in claim 4 wherein, using a function f(θ) of said steering angle θ, symmetrical around the origin, and a correction gain G $(0<G\leq 1)$, said hysteresis loop on said $\theta$–$X_n$ plane is formed as a closed curve from said line $X_n=+/-X_E$, a curve $X_n=f(\theta)$, and a curve $X_n=Gf(\theta)$.

6. A steering control device as described in claim 5 further comprising means for calculating correction gain calculating a value for said correction gain G based on said upper limit $X_E$ and said function f(θ).

7. A steering control device as described in claim 3 wherein, using a function f(θ) of said steering angle θ, symmetrical around the origin, and a correction gain G $(0<G\leq 1)$, said hysteresis loop on said $\theta$–$X_n$ plane is formed as a closed curve from said line $X_n=+/-X_E$, a curve $X_n=f(\theta)$, and a curve $X_n=Gf(\theta)$.

8. A steering control device as described in claim 7 further comprising means for calculating correction gain calculating a value for said correction gain G based on said upper limit $X_E$ and said function f(θ).

9. A steering control device as described in claim 2 wherein, using a function f(θ) of said steering angle θ, symmetrical around the origin, and a correction gain G $(0<G\leq 1)$, said hysteresis loop on said $\theta$–$X_n$ plane is formed as a closed curve from said line $X_n=+/-X_E$, a curve $X_n=f(\theta)$, and a curve $X_n=Gf(\theta)$.

10. A steering control device as described in claim 9 further comprising means for calculating correction gain calculating a value for said correction gain G based on said upper limit $X_E$ and said function f(θ).

11. A steering control device as described in claim 2 further comprising means for varying a steering angle threshold dynamically changing upper and lower limits of a predetermined tolerance range $(-\theta_E \leq \theta \leq \theta_E)$ of said steering angle θ based on an automobile velocity v.

12. A steering control device as described claim 2 wherein said steering mechanism includes means for generating endpoint reactions generating, at a vicinity of an upper limit position $\theta_E$ of said steering angle θ and at a vicinity of a lower limit position $-\theta_E$ of said steering angle θ, a virtual abutment resistance restricting said steering angle θ from exceeding a predetermined tolerance range $(-\theta_R \leq \theta \leq \theta_E)$, based on said steering angle θ, said turning displacement X, or an instruction value $X_n$ for said turning displacement X.

13. A steering control device as described in claim 1 further comprising means for setting an endpoint setting a target coordinate for an endpoint $P_O$ that closes said hysteresis loop.

14. A steering control device as described in claim 13 wherein said endpoint setting means includes means for varying a target point dynamically varying said target coordinate for said endpoint $P_O$ based on a steering velocity ω(=dθ/dt), a steering torque τ, said steering angle θ, said steering direction, or an automobile velocity v.

15. A steering control device as described in claim 14 wherein, using a function f(θ) of said steering angle θ, symmetrical around the origin, and a correction gain G (0<G≦1), said hysteresis loop on said θ–$X_n$ plane is formed as a closed curve from said line $X_n$=+/−$X_E$, a curve $X_n$=f(θ), and a curve $X_n$=Gf(θ).

16. A steering control device as described in claim 15 further comprising means for calculating correction gain calculating a value for said correction gain G based on said upper limit $X_E$ and said function f(θ).

17. A steering control device as described in claim 14 further comprising means for varying a steering angle threshold dynamically changing upper and lower limits of a predetermined tolerance range $(-\theta_E \leq \theta \leq \theta_E)$ of said steering angle θ based on an automobile velocity v.

18. A steering control device as described claim 14 wherein said steering mechanism includes means for generating endpoint reactions generating, at a vicinity of an upper limit position $\theta_E$ of said steering angle θ and at a vicinity of a lower limit position $-\theta_E$ of said steering angle θ, a virtual abutment resistance restricting said steering angle θ from exceeding a predetermined tolerance range $(-\theta_R \leq \theta \leq \theta_E)$, based on said steering angle θ, said turning displacement X, or an instruction value $X_n$ for said turning displacement X.

19. A steering control device as described in claim 13 wherein, using a function f(θ) of said steering angle θ, symmetrical around the origin, and a correction gain G (0<G≦1), said hysteresis loop on said θ–$X_n$ plane is formed as a closed curve from said line $X_n$=+/−$X_E$, a curve $X_n$=f(θ), and a curve $X_n$=Gf(θ).

20. A steering control device as described in claim 19 further comprising means for calculating correction gain calculating a value for said correction gain G based on said upper limit $X_E$ and said function f(θ).

21. A steering control device as described in claim 13 further comprising means for varying a steering angle threshold dynamically changing upper and lower limits of a predetermined tolerance range $(-\theta_E \leq \theta \leq \theta_E)$ of said steering angle θ based on an automobile velocity v.

22. A steering control device as described claim 13 wherein said steering mechanism includes means for generating endpoint reactions generating, at a vicinity of an upper limit position $\theta_E$ of said steering angle θ and at a vicinity of a lower limit position $-\theta_E$ of said steering angle θ, a virtual abutment resistance restricting said steering angle θ from exceeding a predetermined tolerance range $(-\theta_R \leq \theta \leq \theta_E)$, based on said steering angle θ, said turning displacement X, or an instruction value $X_n$ for said turning displacement X.

23. A steering control device as described in claim 1 wherein, using a function f(θ) of said steering angle θ, symmetrical around the origin, and a correction gain G (0<G≦1), said hysteresis loop on said θ–$X_n$ plane is formed as a closed curve from said line $X_n$=+/−$X_E$, a curve $X_n$=f(θ), and a curve $X_n$=Gf(θ).

24. A steering control device as described in claim 23 further comprising means for calculating correction gain calculating a value for said correction gain G based on said upper limit $X_E$ and said function f(θ).

25. A steering control device as described in claim 24 further comprising means for asymptote normalization monotonically increasing said correction gain G (0<G≦1) in a dynamic manner based on a steering amount S, a steering status, a turning amount Z, or a turning status after initiation of restorative steering having as a starting point said line $X_n$=+/−$X_E$.

26. A steering control device as described in claim 25 wherein said asymptote normalizing means includes means for varying an asymptote rate using a steering velocity ω(=dθ/dt), a steering torque τ, said steering angle θ, said steering direction, or an automobile velocity v, in order to dynamically change an asymptote rate A (=dG/dS) for said steering amount S of said correction gain G or an asymptote rate B (=dG/dZ) for said turning amount Z of said correction gain G when said correction gain G (0<G≦1) is being monotonically increased in a dynamic manner.

27. A steering control device as described in claim 26 further comprising means for varying a steering angle threshold dynamically changing upper and lower limits of a predetermined tolerance range $(-\theta_E \leq \theta \leq \theta_E)$ of said steering angle θ based on an automobile velocity v.

28. A steering control device as described claim 26 wherein said steering mechanism includes means for generating endpoint reactions generating, at a vicinity of an upper limit position $\theta_E$ of said steering angle θ and at a vicinity of a lower limit position $-\theta_E$ of said steering angle θ, a virtual abutment resistance restricting said steering angle θ from exceeding a predetermined tolerance range $(-\theta_R \leq \theta \leq \theta_E)$, based on said steering angle θ, said turning displacement X, or an instruction value $X_n$ for said turning displacement X.

29. A steering control device as described in claim 24 further comprising means for varying a steering angle threshold dynamically changing upper and lower limits of a predetermined tolerance range $(-\theta_E \leq \theta \leq \theta_E)$ of said steering angle θ based on an automobile velocity v.

30. A steering control device as described claim 24 wherein said steering mechanism includes means for generating endpoint reactions generating, at a vicinity of an upper limit position $\theta_E$ of said steering angle θ and at a vicinity of a lower limit position $-\theta_E$ of said steering angle θ, a virtual abutment resistance restricting said steering angle θ from exceeding a predetermined tolerance range $(-\theta_R \leq \theta \leq \theta_E)$, based on said steering angle θ, said turning displacement X, or an instruction value $X_n$ for said turning displacement X.

31. A steering control device as described in claim 23 further comprising means for asymptote normalization monotonically increasing said correction gain G (0<G≦1) in a dynamic manner based on a steering amount S, a steering status, a turning amount Z, or a turning status after initiation of restorative steering having as a starting point said line $X_n = +/- X_E$.

32. A steering control device as described in claim 31 wherein said asymptote normalizing means includes means for varying an asymptote rate using a steering velocity $\omega(=d\theta/dt)$, a steering torque $\tau$, said steering angle $\theta$, said steering direction, or an automobile velocity v, in order to dynamically change an asymptote rate A ($\equiv dG/dS$) for said steering amount S of said correction gain G or an asymptote rate B ($\equiv dG/dZ$) for said turning amount Z of said correction gain G when said correction gain G ($0 < G \leq 1$) is being monotonically increased in a dynamic manner.

33. A steering control device as described in claim 31 further comprising means for varying a steering angle threshold dynamically changing upper and lower limits of a predetermined tolerance range ($-\theta_E \leq \theta \leq \theta_E$) of said steering angle $\theta$ based on an automobile velocity v.

34. A steering control device as described claim 31 wherein said steering mechanism includes means for generating endpoint reactions generating, at a vicinity of an upper limit position $\theta_E$ of said steering angle $\theta$ and at a vicinity of a lower limit position $-\theta_E$ of said steering angle $\theta$, a virtual abutment resistance restricting said steering angle $\theta$ from exceeding a predetermined tolerance range ($-\theta_R \leq \theta \leq \theta_E$), based on said steering angle $\theta$, said turning displacement X, or an instruction value $X_n$ for said turning displacement X.

35. A steering control device as described in claim 23 further comprising means for varying a steering angle threshold dynamically changing upper and lower limits of a predetermined tolerance range ($-\theta_E \leq \theta \leq \theta_E$) of said steering angle $\theta$ based on an automobile velocity v.

36. A steering control device as described claim 23 wherein said steering mechanism includes means for generating endpoint reactions generating, at a vicinity of an upper limit position $\theta_E$ of said steering angle $\theta$ and at a vicinity of a lower limit position $-\theta_E$ of said steering angle $\theta$, a virtual abutment resistance restricting said steering angle $\theta$ from exceeding a predetermined tolerance range ($-\theta_R \leq \theta \leq \theta_E$), based on said steering angle $\theta$, said turning displacement X, or an instruction value $X_n$ for said turning displacement X.

37. A steering control device as described in claim 1 further comprising means for varying a steering angle threshold dynamically changing upper and lower limits of a predetermined tolerance range ($-\theta_E \leq \theta \leq \theta_E$) of said steering angle $\theta$ based on an automobile velocity v.

38. A steering control device as described claim 37 wherein said steering mechanism includes means for generating endpoint reactions generating, at a vicinity of an upper limit position $\theta_E$ of said steering angle $\theta$ and at a vicinity of a lower limit position $-\theta_E$ of said steering angle $\theta$, a virtual abutment resistance restricting said steering angle $\theta$ from exceeding a predetermined tolerance range ($-\theta_R \leq \theta \leq \theta_E$), based on said steering angle $\theta$, said turning displacement X, or an instruction value $X_n$ for said turning displacement X.

39. A steering control device as described claim 1 wherein said steering mechanism includes means for generating endpoint reactions generating, at a vicinity of an upper limit position $\theta_E$ of said steering angle $\theta$ and at a vicinity of a lower limit position $-\theta_E$ of said steering angle $\theta$, a virtual abutment resistance restricting said steering angle $\theta$ from exceeding a predetermined tolerance range ($-\theta_R \leq \theta \leq \theta_E$), based on said steering angle $\theta$, said turning displacement X, or an instruction value $X_n$ for said turning displacement X.

* * * * *